United States Patent
Ryu et al.

(10) Patent No.: US 8,750,331 B2
(45) Date of Patent: Jun. 10, 2014

(54) METHOD AND APPARATUS FOR TRANSPORTING MOBILE BROADCASTING SERVICE, AND METHOD AND APPARATUS FOR RECEIVING MOBILE BROADCASTING SERVICE

(75) Inventors: Ga-hyun Ryu, Suwon-si (KR); Sung-il Park, Suwon-si (KR); Jong-hwa Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 484 days.

(21) Appl. No.: 12/138,549

(22) Filed: Jun. 13, 2008

(65) Prior Publication Data

US 2008/0313678 A1 Dec. 18, 2008

Related U.S. Application Data

(60) Provisional application No. 60/944,619, filed on Jun. 18, 2007.

(30) Foreign Application Priority Data

Oct. 15, 2007 (KR) .......................... 10-2007-0103725

(51) Int. Cl.
 *H04L 12/28* (2006.01)
(52) U.S. Cl.
 USPC ............................. 370/474; 370/472; 370/512
(58) Field of Classification Search
 None
 See application file for complete search history.

(56) References Cited

U.S. PATENT DOCUMENTS

| | | | | |
|---|---|---|---|---|
| 5,274,768 A | * | 12/1993 | Traw et al. | 709/236 |
| 5,400,401 A | | 3/1995 | Wasilewski et al. | |
| 5,689,501 A | * | 11/1997 | Takase et al. | 370/244 |
| 5,809,012 A | * | 9/1998 | Takase et al. | 370/229 |
| 5,991,308 A | * | 11/1999 | Fuhrmann et al. | 370/395.53 |
| 6,215,530 B1 | | 4/2001 | Wasilewski | |
| 6,411,620 B1 | * | 6/2002 | Takase et al. | 370/390 |
| 6,598,226 B1 | | 7/2003 | Sorensen | |
| 6,888,844 B2 | * | 5/2005 | Mallory et al. | 370/466 |

(Continued)

FOREIGN PATENT DOCUMENTS

| | | |
|---|---|---|
| CN | 1671191 A | 9/2005 |
| CN | 1929614 A | 3/2007 |

(Continued)

OTHER PUBLICATIONS

Setlur, et al., "A Mobile Open Rich Media Environment", ICME. 2006.26.26.12, Jul. 9, 2006, pp. 2029-2032.

(Continued)

*Primary Examiner* — Ayaz Sheikh
*Assistant Examiner* — Faiyazkhan Ghafoerkhan
(74) *Attorney, Agent, or Firm* — Sughrue Mion, PLLC

(57) ABSTRACT

Methods and apparatuses for transporting and receiving mobile broadcasting services in order to efficiently provide broadcasting services in a mobile communication system are provided. In the method of receiving mobile broadcasting services, a predetermined transport channel is determined by using service configuration information extracted from a service information channel, at least one transport packet is extracted from the determined transport channel, information about the transport packets is extracted from the transport packets, at least one encapsulation packet including the transport packets is generated by using the information about the transport packets, and application data including the encapsulation packets is generated by using information about the encapsulation packets which is extracted from the encapsulation packets.

34 Claims, 24 Drawing Sheets

(56) References Cited

U.S. PATENT DOCUMENTS

| | | | |
|---|---|---|---|
| 7,477,630 | B2 | 1/2009 | Kim et al. |
| 7,792,121 | B2 | 9/2010 | Thompson, III et al. |
| 7,886,323 | B2 | 2/2011 | Park |
| 8,340,133 | B2* | 12/2012 | Kim et al. ............ 370/474 |
| 2002/0057713 | A1* | 5/2002 | Bagchi et al. ......... 370/468 |
| 2002/0101871 | A1* | 8/2002 | Takase et al. ......... 370/390 |
| 2002/0142757 | A1 | 10/2002 | Leung et al. |
| 2002/0146038 | A1 | 10/2002 | Casavant et al. |
| 2002/0178236 | A1* | 11/2002 | Patel et al. ........... 709/218 |
| 2003/0063615 | A1 | 4/2003 | Luoma et al. |
| 2003/0227906 | A1* | 12/2003 | Hallman ............... 370/352 |
| 2003/0227913 | A1* | 12/2003 | Hallman et al. ....... 370/374 |
| 2004/0103430 | A1 | 5/2004 | Lee et al. |
| 2004/0136352 | A1* | 7/2004 | Fu et al. ............... 370/341 |
| 2004/0190629 | A1* | 9/2004 | Cooper et al. ....... 375/240.26 |
| 2005/0232136 | A1 | 10/2005 | Kwak |
| 2005/0233705 | A1* | 10/2005 | Vare et al. ............. 455/70 |
| 2005/0273833 | A1 | 12/2005 | Soinio |
| 2006/0053450 | A1 | 3/2006 | Saarikivi et al. |
| 2006/0067317 | A1 | 3/2006 | Engstrand et al. |
| 2006/0246836 | A1* | 11/2006 | Simon ................. 455/3.01 |
| 2006/0294205 | A1 | 12/2006 | Aaltonen et al. |
| 2007/0040937 | A1 | 2/2007 | Eum |
| 2007/0041377 | A1 | 2/2007 | Song et al. |
| 2007/0118586 | A1 | 5/2007 | Hwang et al. |
| 2007/0255855 | A1* | 11/2007 | Knapp et al. .......... 709/248 |
| 2008/0005767 | A1* | 1/2008 | Seo ..................... 725/62 |
| 2008/0285556 | A1 | 11/2008 | Park et al. |
| 2009/0214043 | A1 | 8/2009 | Choi et al. |

FOREIGN PATENT DOCUMENTS

| | | | |
|---|---|---|---|
| EP | 1081866 A3 | 3/2001 | |
| JP | 2000069454 A | 3/2000 | |
| JP | 2007-006349 A | 1/2007 | |
| KR | 10-2004-0007588 A | 1/2004 | |
| KR | 10-2004-0036447 A | 4/2004 | |
| KR | 10-2004-0058502 A | 7/2004 | |
| KR | 10-2004-0062893 A | 7/2004 | |
| KR | 10-2005-0056708 A | 6/2005 | |
| KR | 10-0565098 B1 | 3/2006 | |
| KR | 10-2006-0059877 A | 6/2006 | |
| KR | 10-2006-0126056 A | 12/2006 | |
| KR | 10-2007-0021032 A | 2/2007 | |
| KR | 10-2007-0025851 A | 3/2007 | |
| KR | 10-0692903 B1 | 3/2007 | |
| KR | 10-2007-0049042 A | 5/2007 | |
| KR | 10-2008-0100753 A | 11/2008 | |
| KR | 10-2009-0090809 A | 8/2009 | |
| WO | 03/010975 A1 | 2/2003 | |
| WO | 2005/041594 A1 | 5/2005 | |
| WO | 2006/006009 A1 | 1/2006 | |
| WO | 2007/013026 A2 | 2/2007 | |
| WO | WO 2007013026 A2 * | 2/2007 | |

OTHER PUBLICATIONS

Communication from the Canadian Patent Office in counterpart Canadian application No. 2,667,571 issued Apr. 4, 2011.
Communication from the Canadian Patent Office in counterpart Canadian application No. 2,666,573 issued Apr. 18, 2011.
Communication dated Jun. 2, 2011, issued in counterpart Mexican Application No. MX/a/2009/004942.
Communication dated Jul. 29, 2011, issued in counterpart Korean Application No. 10-2011-7016426.
Communication dated Jul. 2, 2012 from the State Intellectual Property Office of P.R. China in a counterpart application No. 200880001075.4.
Communication from the Canadian Patent Office issued Jul. 5, 2012 in counterpart Canadian Application No. 2702054.
Communication from the Canadian Patent Office issued Jul. 9, 2012 in counterpart Canadian Application No. 2667571.
Communication dated Nov. 23, 2011 issued by the Korean Intellectual Property Office in counterpart Korean Patent Application No. 10-2009-7016241.
Communication dated Jan. 5, 2013 issued by the State Intellectual Property Office of P.R. China in counterpart Chinese Patent Application No. 200880001075.4.
"Radio Broadcasting Systems; Digital Audio Broadcasting (DAB) to mobile, portable and fixed receivers", Final Draft ETSI EN 300 401 V1.4.1, European Standard (Telecommunications series), Jan. 25, 2006, pp. 1-197.
Office Action from the State Intellectual Property Office of P.R. China, dated Sep. 15, 2011, issued in corresponding Chinese Application No. 200880001062.7.
Communication dated May 2, 2013 issued by the State Intellectual Property Office of P.R. China in counterpart Chinese Patent Application No. 200880001075.4.
Communication dated May 31, 2013 issued by the Canadian Intellectual Property Office in counterpart Canadian Patent Application No. 2 702 054.
Communication dated Jul. 10, 2013 issued by the Korean Intellectual Property Office in counterpart Korean Patent Application No. 10-2010-0108395.
Communication dated Jul. 10, 2013 issued by the Korean Intellectual Property Office in counterpart Korean Patent Application No. 10-2010-0108396.
Communication dated Jul. 10, 2013 issued by the Korean Intellectual Property Office in counterpart Korean Patent Application No. 10-2010-0108397.
Communication dated Jul. 31, 2013, issued by the Korean Intellectual Property Office in counterpart Korean Application No. 10-2007-0074642.
Communication from the Finnish Patent Office issued Mar. 8, 2012 in counterpart Finnish Application No. 20095929.
International Search Report and Written Opinion for PCT/KR2008/002699, dated Sep. 29, 2008.
International Search Report and Written Opinion for PCT/KR2008/003267, dated Dec. 9, 2008.
International Search Report and Written Opinion for PCT/KR2008/002697, dated Nov. 5, 2008.
International Search Report and Written Opinion for PCT/KR2008/001372, dated Jul. 8, 2008.
International Search Report and Written Opinion for PCT/KR2008/002750, dated Sep. 25, 2008.
Communication, dated Nov. 6, 2013, issued by the Finnish Patent and Registration Office in counterpart Finnish Patent Application No. 20095927.
Communication, dated Jan. 16, 2014, issued by the Finnish Patent and Registration Office in counterpart Finnish Patent Application No. 20105338.
Communication, dated Dec. 17, 2013, issued by the Korean Intellectual Property Office in counterpart Korean Patent Application No. 10-2007-0124371.
Communication, dated Dec. 17, 2013, issued by the Canadian Intellectual Property Office in counterpart Canadian Patent Application No. 2,667,571.

* cited by examiner

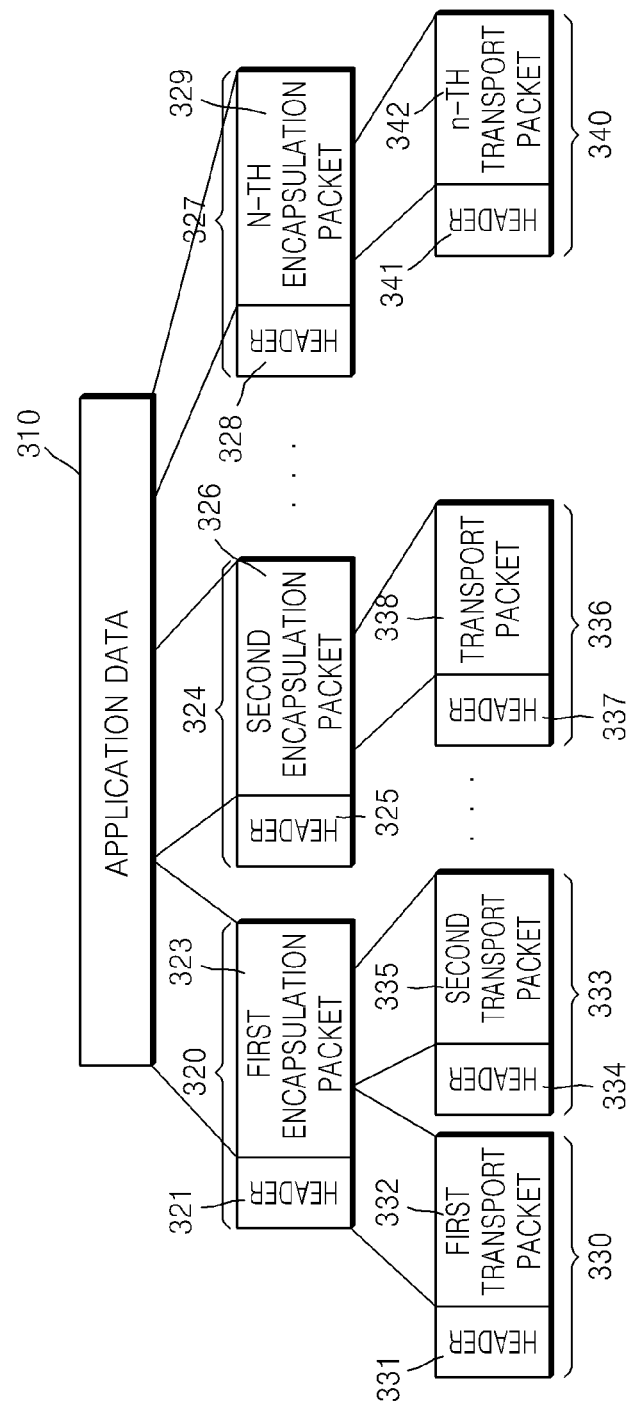

| VALUE | Description |
|---|---|
| 0 | Intermediate packet of a series |
| 1 | Last packet of a series |
| 2 | First packet of a series |
| 3 | The one and only packet |

FIG. 4C

```
Syntax
ATSC_MCAST_Signaling_Encapsulation_Packet()
{
  first_last
  compression_flag
  signal_ type
  sequence_number
  version_number
  packet_length
  for(i=0; i<N; i++){
    data_byte
   }
}
```

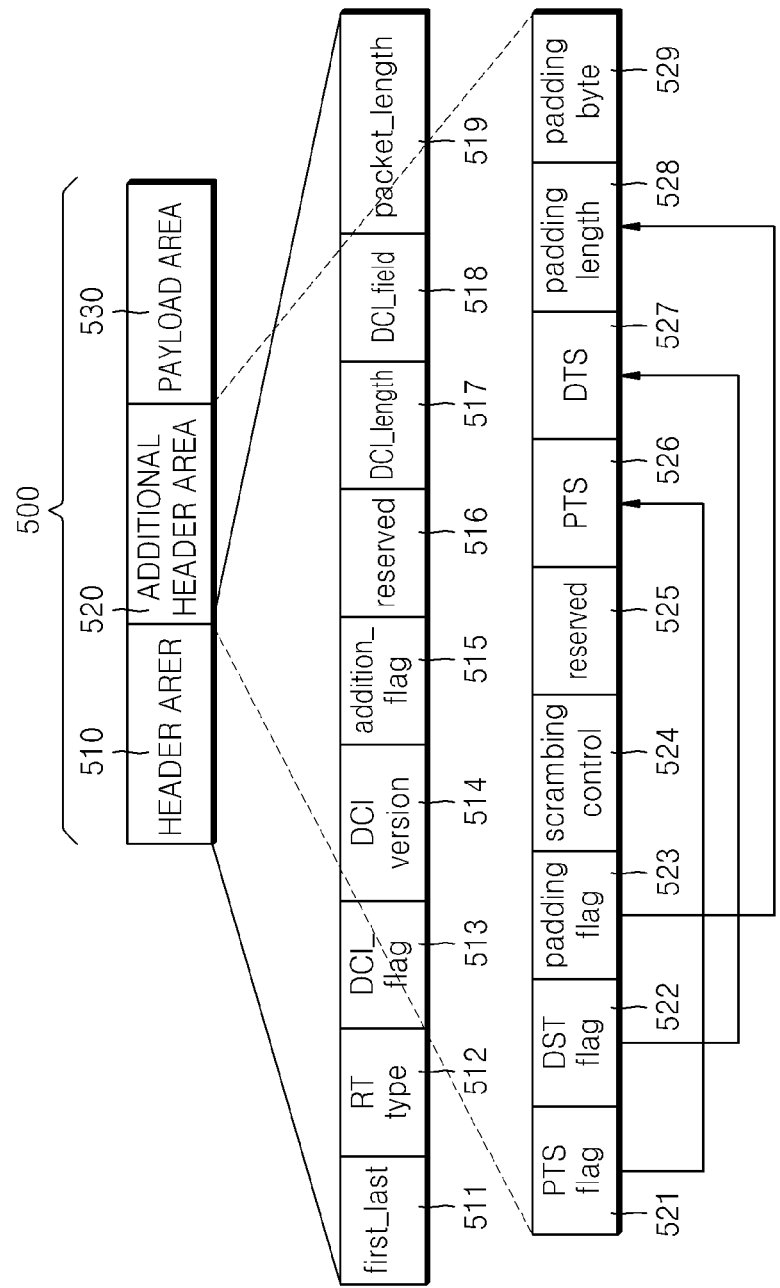

FIG. 5B

```
Syntax
ATSC_MCAST_Real-Time_Encapsulation_Packet()
{
    first_last
    RT_type
    DCI_flag
    DC_version
    addition_flag
    reserved
    if(DCI_flag==1){
        DCI_length
        for(i=0; i<N; i++)
            DCI_field
    }
    packet_length
    if(addition_flag==1){
        PTS_flag
        DTS_flag
        padding_flag
        scrambling_control
        reserved
        if(PTS_flag==1)
            reserved
                PTS_high
            PTS
        if(DTS_flag==1)
            reserved
                DTS_high
            DTS
        if(padding_flag==1){
            padding_length
            for(i=0; i<N; i++)
                padding_byte
        }
    }
}
```

FIG. 5C
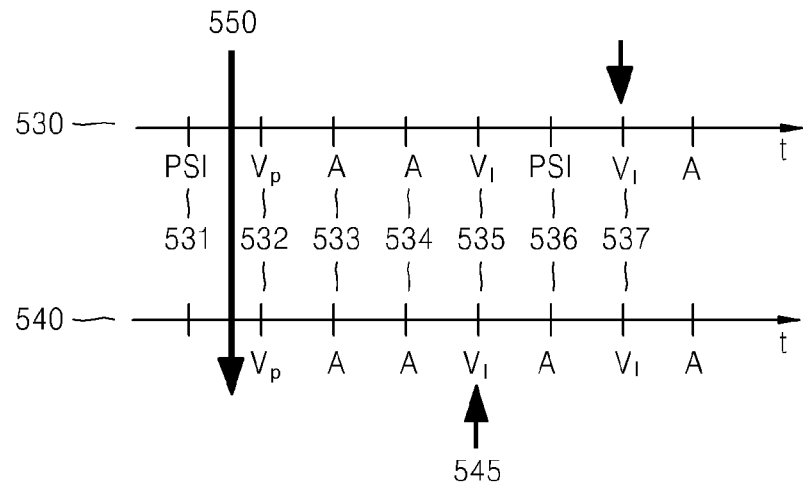
FIG. 5D
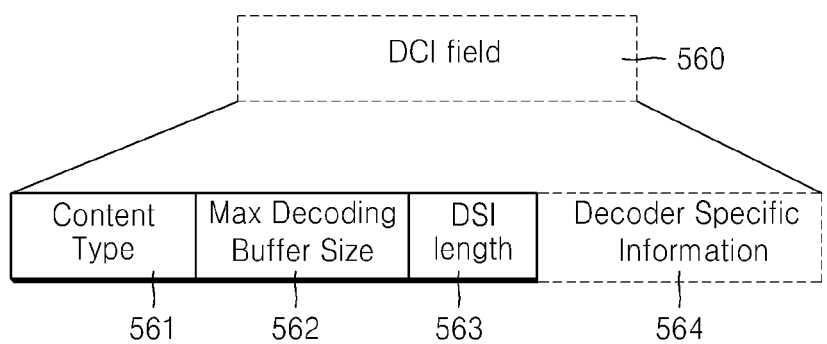
FIG. 5E
| VALUE | Content type Description |
|---|---|
| 0 | reserved |
| 1 | H.264/AVC |
| 2 | HE AAC |
| 3~255 | TBD |

FIG. 6B

```
Syntax

ATSC_MCAST_IP_Encapsulation_Packet()
{
    first_last
    if(first_last & 10){
        addition_flag
        IP_ type
        reserved
        encapsulation_packet_length
    else{
        reserved
        sequence_number
        encapsulation_packet_length
    }
    if(addition_flag==1){
        do{
            continuity_flag
            tag
            length
            Additional Field Data
        }while(continuity_flag==1)
    }
    for(i=0; i<N; i++){
        payload
    }
}
```

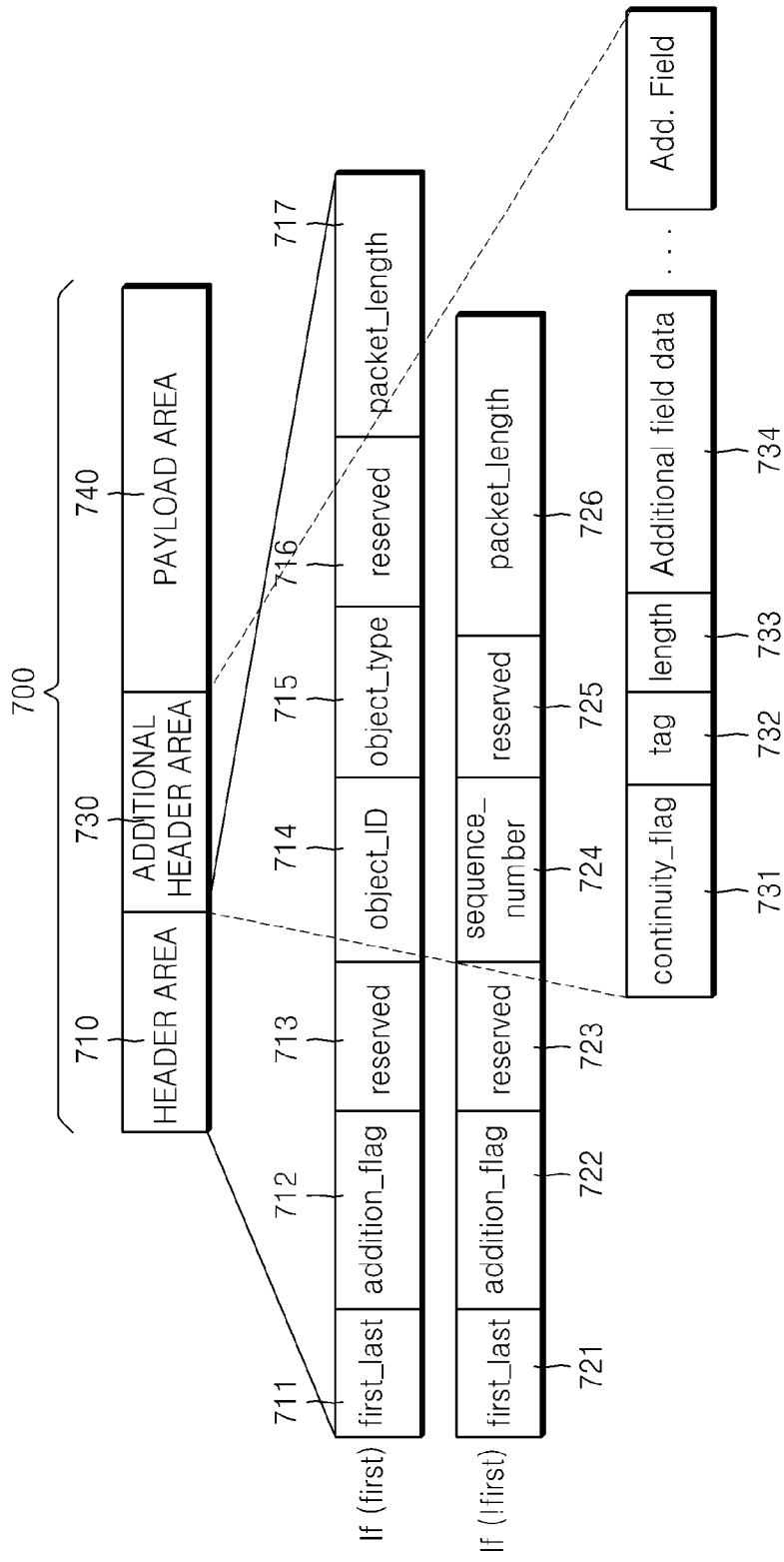

FIG. 7B

```
Syntax
ATSC_MCAST_Object_Encapsulation_Packet()
{
    first_last
    addition_flag
    if(first_last & 10){
        reserved
        object_ID
        object_type
        reserved
        packet_length
    else{
        reserved
        sequence_number
        reserved
        packet_length
    }
    if(addition_flag==1){
        do{
            continuity_flag
            tag
            length
            Additional Field Data
        }while(continuity_flag==1)
    }
    for(i=0; i<N; i++){
        payload
    }
}
```

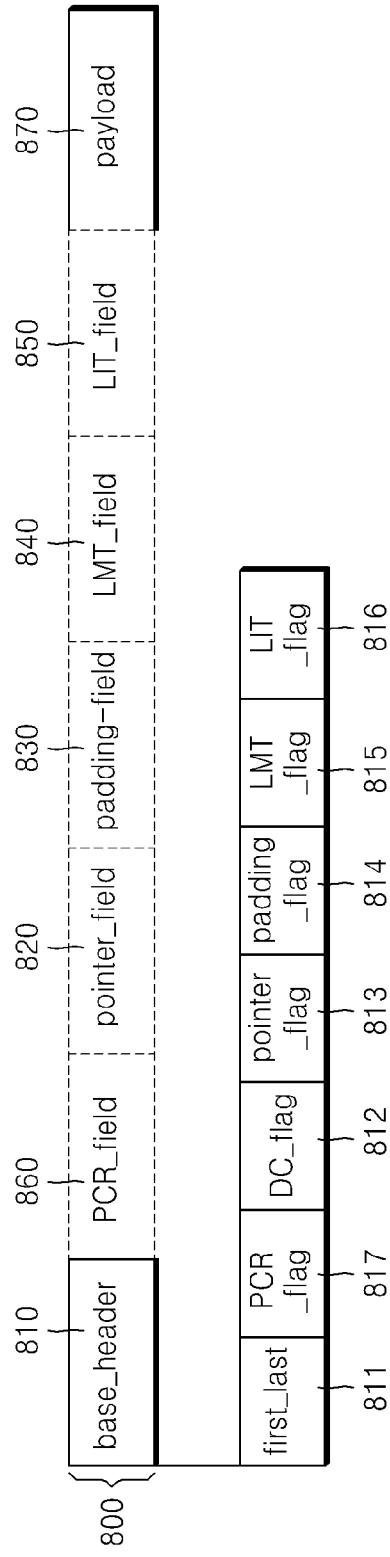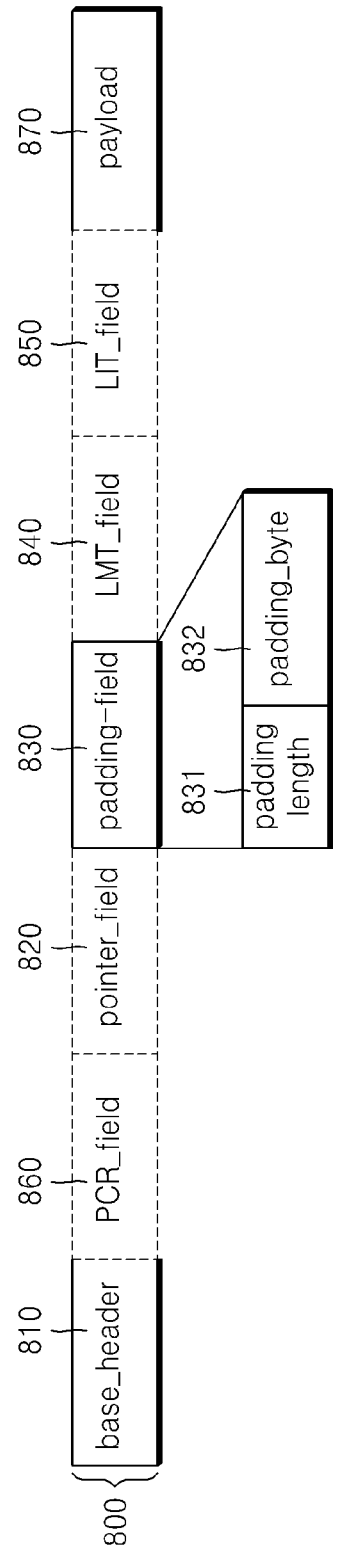

FIG. 8E

```
Syntax
ATSC_MCAST_Transport_Packet()
{
    first_last
    DC_flag
    pointer_flag
    padding_flag
    LMT_flag
    LIT_flag
    PCR_flag
    if(pointer_flag==1)
        pointer_field
    if(padding_flag==1){
        padding_length
        for(i=0; i<N; i++)
            padding_byte
    }
    if(LMT_flag==1){
        type_bitmap
        reserved
        version_number
        if(type_bitmap & 100){
            real-time_channel_number
            for(i=0; i<N1; i++)
                real-time_channel_pointer
        }
        if(type_bitmap & 010){
            IP_channel_number
            for(i=0; i<N2; i++)
                IP_channel_pointer
        }
        if(Type_bitmap & 001){
            object_channel_number
            for(i=0; i<N3; i++)
                object_channel_pointer
        }
    }
    if(LIT_flag==1){
        service_number
        version_number
        for(i=0; i<N; i++){
            service_ID
            for(i=0; i<N1; i++){
                next_indicator
                LMT_index_number
            }
        }
    }
    for(i=0; i<N; i++){
        data_byte
    }
}
```

FIG. 10A

```
Syntax
ServiceConfigurationInformation()
{
    turbo_channel_information_flag
    additional_service_information_flag
    padding_flag
    reserved
    version_indicator_information ()
    frame_group_information ()
    if(turbo_channel_information_flag)
    {
        turbo_channel_information ()
    }
    if (additional_service_information_flag)
    {
        addtional_service_information()
    }
    if(padding_flag)
    {
        byte
    }
    CRC
}
```

FIG. 10B

| Syntax |
|---|
| version_indicator_information() <br><br> { <br><br>    frame_counter <br><br>    version <br><br> } |

FIG. 10C

| Syntax |
|---|
| frame_group_information{ <br><br>    current_frame_number <br><br>    total_frame_number <br><br> } |

FIG. 10D

```
Syntax
turbo_channel_information ()
{
    version
    Turbo_svc
    For (i=0; i<=turbo_svc; i++)
    {
        Turbo_svc_id
        Is_Enhanced
        Reserved
        MCAST_Frame_Slicing_flag
        turbo_start_position
        turbo_fragments_bits
        turbo_arrange_index
        coding_rates
        reserved
        if (MCAST_Frame_Slicing_flag)
        {
            Start_frame_number
            Frame_block_number
        }
    }
}
```

METHOD AND APPARATUS FOR TRANSPORTING MOBILE BROADCASTING SERVICE, AND METHOD AND APPARATUS FOR RECEIVING MOBILE BROADCASTING SERVICE

CROSS-REFERENCE TO RELATED PATENT APPLICATION

This application claims priority from U.S. Provisional Patent Application No. 60/944,619, filed on Jun. 18, 2007, in the U.S. Patent and Trademark Office, and priority from Korean Patent Application No. 10-2007-0103725, filed on Oct. 15, 2007, in the Korean Intellectual Property Office, the disclosures of which are incorporated herein in their entirety by reference.

BACKGROUND OF THE INVENTION

1. Field of the Invention

Methods and apparatuses consistent with the present invention relate to providing broadcasting services in a mobile communications system, and more particularly, to providing broadcasting services in a mobile communications system, allowing the mobile communications system to efficiently provide broadcasting services that conform to an Advanced Television System Committee (ATSC) standard.

2. Description of the Related Art

ATSC denotes a United States digital television (DTV) standard among terrestrial DTV broadcasting standards. The ATSC standard basically relates to compression, transmission, etc. of video and audio data. The ATSC standard employs MPEG2 for video compression, AC-3 for audio compression, and Vestigial Side Band (VSB) for signal transmission. The VSB, which is a terrestrial DTV reception standard, provides a high utilization of frequency bands and thus maximizes a frequency band on which viewable electric waves are carried. On the other hand, the VSB standard provides poor electric wave reception during movement of a mobile communications system and thus cannot be used in mobile TVs.

The demand and necessity of broadcasting services provided by mobile communications devices, such as terrestrial digital multimedia broadcasting (DMB) services or satellite DMB services, are increasing, and diverse broadcasting services are required. Therefore, a variety of broadcasting techniques for satisfying the needs of users have been proposed.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method and apparatus for transporting broadcasting services, by which a mobile communications system can quickly and efficiently provide high-quality standard broadcasting services, and a method and apparatus for receiving broadcasting services.

According to an aspect of the present invention, there is provided a method of transporting mobile broadcasting services, the method comprising the operations of: generating an encapsulation packet including configuration information corresponding to the type of application data to be transported and the application data; generating transport packets including data of predetermined-sized parts into which the encapsulation packet is divided, wherein the transport packets further include information about the structures of the transport packets; and generating service configuration information including information about channels including the transport packets, and including the service configuration information in a service information channel at a predetermined location on a transport stream from among a plurality of transport channels on the transport stream.

The method further comprises the operations of: generating a transport stream with the data of the transport channels; and generating and transporting a frame including the transport stream.

When the application data is real-time media data, the operation of generating the encapsulation packet comprises the operation of including decoder configuration information in the encapsulation packet. The decoder configuration information comprises at least one of a content type, a decoding buffer length, a length of decoder specification information, and the decoder specification information.

When the application data is signaling data, the operation of generating the encapsulation packet comprises the operation of including, in the encapsulation packet, at least one of information indicating whether the encapsulation packet is the first or last packet, information indicating whether data included in a payload area of the encapsulation packet is compressed, information indicating the type of data in the payload area, sequence number information, information indicating the version of the signaling encapsulation packet, and information indicating the total number of bytes of the payload area.

When the application data is Internet Protocol (IP) data, the operation of generating the encapsulation packet comprises the operation of including, in the encapsulation packet, information indicating whether the encapsulation packet is the first or last packet. When the encapsulation packet is the first packet, the operation of generating the encapsulation packet comprises the operation of further including in the encapsulation packet at least one of information indicating whether additional data is included, information indicating the type of IP data in a payload area of the encapsulation packet, information specifying reserved bits, and information indicating the number of bytes of the encapsulation packet in addition to the information indicating whether the encapsulation packet is the first or last packet. When the encapsulation packet is not the first packet, the operation of generating the encapsulation packet comprises the operation of further including in the encapsulation packet at least one of information specifying reserved bits, information specifying a sequence number, and information indicating the number of bytes of the encapsulation packet in addition to the information indicating whether the encapsulation packet is the first or last packet.

When the application data is object data, the operation of generating the encapsulation packet comprises the operation of including in the encapsulation packet at least one of information indicating whether the encapsulation packet is the first or last packet and information indicating whether additional data is included. When the encapsulation packet is the first packet, the operation of generating the encapsulation packet comprises the operation of further including in the encapsulation packet at least one of information specifying reserved bits, information indicating the identification number of object data in a payload area of the encapsulation packet, information indicating the type of object data, and information indicating the number of bytes of the encapsulation packet in addition to the information indicating whether the encapsulation packet is the first or last packet and the information indicating whether the additional data is included. When the encapsulation packet is not the first packet, the operation of generating the encapsulation packet comprises the operation of further including in the encapsulation packet at least one of information specifying reserved bits, information indicating a sequence number, and information indicating the number of bytes of the encapsulation packet in addition to the information indicating whether the encapsulation packet is the first or last packet and the information indicating whether the additional data is included.

In the operation of generating the transport packets, the information about the transport packets comprises basic configuration information, and the basic configuration information comprises at least one of information indicating whether decoder configuration information of the encapsulation packet is included, information indicating whether a location map table of the transport packets is included, information indicating whether a linkage information table of the transport packets is included, and information indicating whether a program clock reference (PCR) of the transport packets is included.

In the operation of generating the transport packets, the information about the transport packets comprises a location map table, and the location map table comprises at least one of information indicating the type of application data of the transport packet, information indicating the version of a location map table, information indicating the number of sub-data channels for real-time media data from among data channels, information indicating the locations of the sub-data channels for the real-time media data, information indicating the number of sub-data channels for IP data, information indicating the locations of the sub-data channels for IP data, information indicating the number of sub-data channels for object data, and information indicating the locations of the sub-data channels for object data.

In the operation of generating the transport packets, the information about the transport packets comprises a linkage information table. The linkage information table comprises at least one of information indicating the number of services that can be provided through a current transport channel, information indicating the version of the linkage information table, and information indicating at least one service. The information indicating at least one service comprises at least one of information indicating the identifications (IDs) of the services through the current transport channel and information indicating at least one component of each of the services. The information indicating at least one component comprises at least one of information indicating whether the next pointer exists and information indicating an index number of the location map table.

The operation of generating the service configuration information comprises the operation of including information about a turbo channel in the service configuration information. The information about the turbo channel comprises at least one of information indicating the version of the turbo channel information, information indicating the total number of turbo services, information indicating an ID of a current turbo service, information indicating the start location of a turbo stream, information indicating an index of a turbo channel length, information indicating a coding rate of the turbo channel, information indicating a number of a start frame of the current turbo service, and information indicating the number of frames required to get the current turbo service. The service information channel is located in a transport channel being at a predetermined location on the transport stream from among the at least one transport channels on the transport stream, and the turbo channel is located in a transport channel other than the service information channel.

The operation of generating the service configuration information comprises the operation of including information about a frame group in the service configuration information, wherein the frame group information comprises at least one of information indicating a number of a current frame in a current frame group and information indicating the total number of frames included in the current frame group. When the service configuration information is changed, the service configuration information is updated and the version number of the service configuration information is changed.

According to another aspect of the present invention, there is provided an apparatus for transporting mobile broadcasting services, comprising: an encapsulation packet generation unit which generates an encapsulation packet including configuration information corresponding to the type of application data to be transported and the application data; a transport packet generation unit which generates transport packets including data of predetermined-sized parts into which the encapsulation packet is divided, wherein the transport packets further include information about the structure of the transport packets; and a service configuration information generation unit which generates service configuration information including information set about channels including the transport packets and includes the service configuration information in a service information channel at a predetermined location on a transport stream from among a plurality of transport channels on the transport stream.

The apparatus further comprises a transport stream generation unit which generates a transport stream with the data of the transport channels, and a transporting unit which generates and transports a frame including the transport stream.

According to another aspect of the present invention, there is provided a method of receiving mobile broadcasting services, the method comprising the operations of: determining a predetermined transport channel by using service configuration information extracted from a service information channel; extracting at least one transport packet from the determined transport channel; extracting information about the transport packets from the transport packets; generating at least one encapsulation packet including the transport packets by using the information about the transport packets; and generating application data including the encapsulation packets by using information about the encapsulation packets which is extracted from the encapsulation packets.

The transport channel is a data area at a predetermined location on a transport stream included in a received frame.

The operation of determining the transport channel comprises the operation of extracting information about a turbo channel from the service configuration information. The information about the turbo channel comprises at least one of information indicating the version of the turbo channel information, information indicating the total number of turbo services, information indicating an ID of a current turbo service, information indicating the start location of a turbo stream, information indicating an index of a turbo channel length, information indicating a coding rate of the turbo channel, information indicating a number of a start frame of the current turbo service, and information indicating the number of frames required to get the current turbo service. The service information channel is located in a transport channel being at a predetermined location on the transport stream from among the at least one transport channels on the transport stream, and the turbo channel is located in a transport channel other than the service information channel.

The operation of determining the transport channel comprises the operation of extracting information about a frame group from the service configuration information, wherein the frame group information comprises at least one of information indicating a number of a current frame in a current frame group and information indicating the total number of frames included in the current frame group. When the service configuration information is changed, the service configuration information is updated and the version number of the service configuration information is changed.

In the operation of generating the encapsulation packets, the information about the transport packets comprises basic configuration information about the transport packets. The basic configuration information comprises at least one of information indicating whether decoder configuration information is included, information indicating whether a location map table is included, information indicating whether a linkage information table is included, and information indicating whether a program clock reference (PCR) is included.

In the operation of generating the encapsulation packets, the information about the transport packets comprises a location map table. The location map table comprises at least one of information indicating the type of application data of the transport packet, information indicating the version of a location map table, information indicating the number of sub-data channels for real-time media data from among data channels, information indicating the locations of the sub-data channels for the real-time media data, information indicating the number of sub-data channels for IP data, information indicating the locations of the sub-data channels for IP data, information indicating the number of sub-data channels for object data, and information indicating the locations of the sub-data channels for object data.

In the operation of generating the encapsulation packets, the information about the transport packets comprises a linkage information table. The linkage information table comprises at least one of information indicating the number of services that can be provided through a current transport channel, information indicating the version of the linkage information table, and information indicating at least one service. The information indicating at least one service comprises at least one of information indicating the IDs of the services through the current transport channel and information indicating at least one component of each of the services. The information indicating at least one component comprises at least one of information indicating whether the next pointer exists and information indicating an index number of the location map table.

In the operation of generating the application data, when the application data is real-time media data, information about the encapsulation packet comprises decoder configuration information. The decoder configuration information comprises at least one of a content type, a decoding buffer length, a length of decoder specification information, and the decoder specification information.

In the operation of generating the application data, when the application data is signaling media data, information about the encapsulation packet comprises at least one of information indicating whether data included in a payload area of the encapsulation packet is compressed, information indicating the type of data in the payload area, sequence number information, information indicating the version of the signaling encapsulation packet, and information indicating the total number of bytes of the payload area.

In the operation of generating the application data, when the application data is IP media data and the encapsulation packet is the first packet, information about the encapsulation packet comprises at least one of information indicating whether additional data is included, information indicating the type of IP data of a payload area of the encapsulation packet, information specifying reserved bits, and information indicating the number of bytes of the encapsulation packet. When the application data is IP media data and the encapsulation packet is not the first packet, the information about the encapsulation packet comprises at least one of information indicating reserved bits, information specifying a sequence number, and information indicating the number of bytes of the encapsulation packet.

In the operation of generating the application data, when the application data is object media data and the encapsulation packet is the first packet, information about the encapsulation packet comprises at least one of information specifying reserved bits, information indicating the identification number of object data of a payload area of the encapsulation packet, information indicating the type of object data, and information indicating the number of bytes of the encapsulation packet. When the application data is object media data and the encapsulation packet is not the first packet, the information about the encapsulation packet comprises at least one of information specifying reserved bits, information indicating a sequence number, and information indicating the number of bytes of the encapsulation packet.

According to another aspect of the present invention, there is provided an apparatus for receiving mobile broadcasting services, the apparatus comprising: a transport channel determination unit which determines a predetermined transport channel by using service configuration information extracted from a service information channel; a transport packet extraction unit which extracts at least one transport packet from the determined transport channel; a transport packet information extraction unit which extracts information about the transport packets from the transport packets; an encapsulation packet generation unit which generates at least one encapsulation packet including the transport packets by using the information about the transport packets; and an application data generation unit which generates application data including the encapsulation packets by using information about the encapsulation packets which is extracted from the encapsulation packets.

The transport channel is a data area at a predetermined location on a transport stream included in a received frame.

The present invention includes a computer-readable recording medium having recorded thereon a program for the method of transporting mobile broadcasting services.

The present invention includes a computer-readable recording medium having recorded thereon a program for the method of receiving mobile broadcasting services.

According to the present invention, since service configuration information is located at a certain area of a transport frame, a broadcasting service receiving apparatus can gain access to a transport channel by using the service configuration information without processing a signaling information channel. In other words, when the broadcasting service receiving apparatus according to the present invention provides broadcasting services, it does not undergo a process of gaining access to each of the broadcasting services after two operations of searching for the signaling information channel from the transport channel and interpreting the found signaling information channel. Therefore, a waiting time required for the broadcasting service receiving apparatus to receive broadcasting services can be reduced.

In addition, structures of an encapsulation packet and a transport packet depend on the type of application data to be provided. Therefore, a data space can be efficiently used, and a high transmission speed is obtained.

Moreover, when broadcasting services providing real-time media data are transported, decoder configuration information is also transported. Thus, a receiver can update a specific configuration of a decoder to be suitable for the format of the media data provided by the broadcasting services prior to decoding the media data by using the decoder configuration information.

BRIEF DESCRIPTION OF THE DRAWINGS

The above and other aspects of the present invention will become more apparent by describing in detail exemplary embodiments thereof with reference to the attached drawings in which:

FIG. 3 illustrates a relationship between application data, an encapsulation packet, and a transport packet;

FIG. 4C illustrates a syntax of the encapsulation packet for signaling data illustrated in FIG. 4A;

FIG. 5A illustrates a structure of an encapsulation packet for real-time media data according to an exemplary embodiment of the present invention;

FIG. 5B illustrates a syntax of the encapsulation packet for real-time media data illustrated in FIG. 5A;

FIG. 5C illustrates a function of decoder configuration information (DCI);

FIG. 5D illustrates a structure of DCI according to an exemplary embodiment of the present invention;

FIG. 5E illustrates a content type description according to an exemplary embodiment of the present invention;

FIG. 6B illustrates a syntax of the encapsulation packet for IP data illustrated in FIG. 6A;

FIG. 7A illustrates a structure of an encapsulation packet for object data according to an exemplary embodiment of the present invention;

FIG. 7B illustrates a syntax of the encapsulation packet for object data illustrated in FIG. 7A;

FIG. 8A illustrates a structure of a basic header field of a transport packet according to an exemplary embodiment of the present invention;

FIG. 8B illustrates a structure of a padding field of the transport packet illustrated in FIG. 8A, according to an exemplary embodiment of the present invention;

FIG. 8E illustrates a syntax of the transport packet illustrated in FIG. 8A;

FIG. 10A illustrates a syntax of service configuration information according to an exemplary embodiment of the present invention;

FIG. 10B illustrates a syntax of version_indicator_information illustrated in FIG. 10A, according to an exemplary embodiment of the present invention;

FIG. 10C illustrates a syntax of frame_group_information illustrated in FIG. 10A, according to an exemplary embodiment of the present invention;

FIG. 10D illustrates a syntax of turbo_channel_information illustrated in FIG. 10A, according to an exemplary embodiment of the present invention;

DETAILED DESCRIPTION OF EXEMPLARY EMBODIMENTS OF THE INVENTION

A method and apparatus for transporting mobile broadcasting services and a method and apparatus for receiving mobile broadcasting services according to an exemplary embodiment of the present invention will now be described in detail with reference to FIGS. 1 through 11B.

Figure 1:
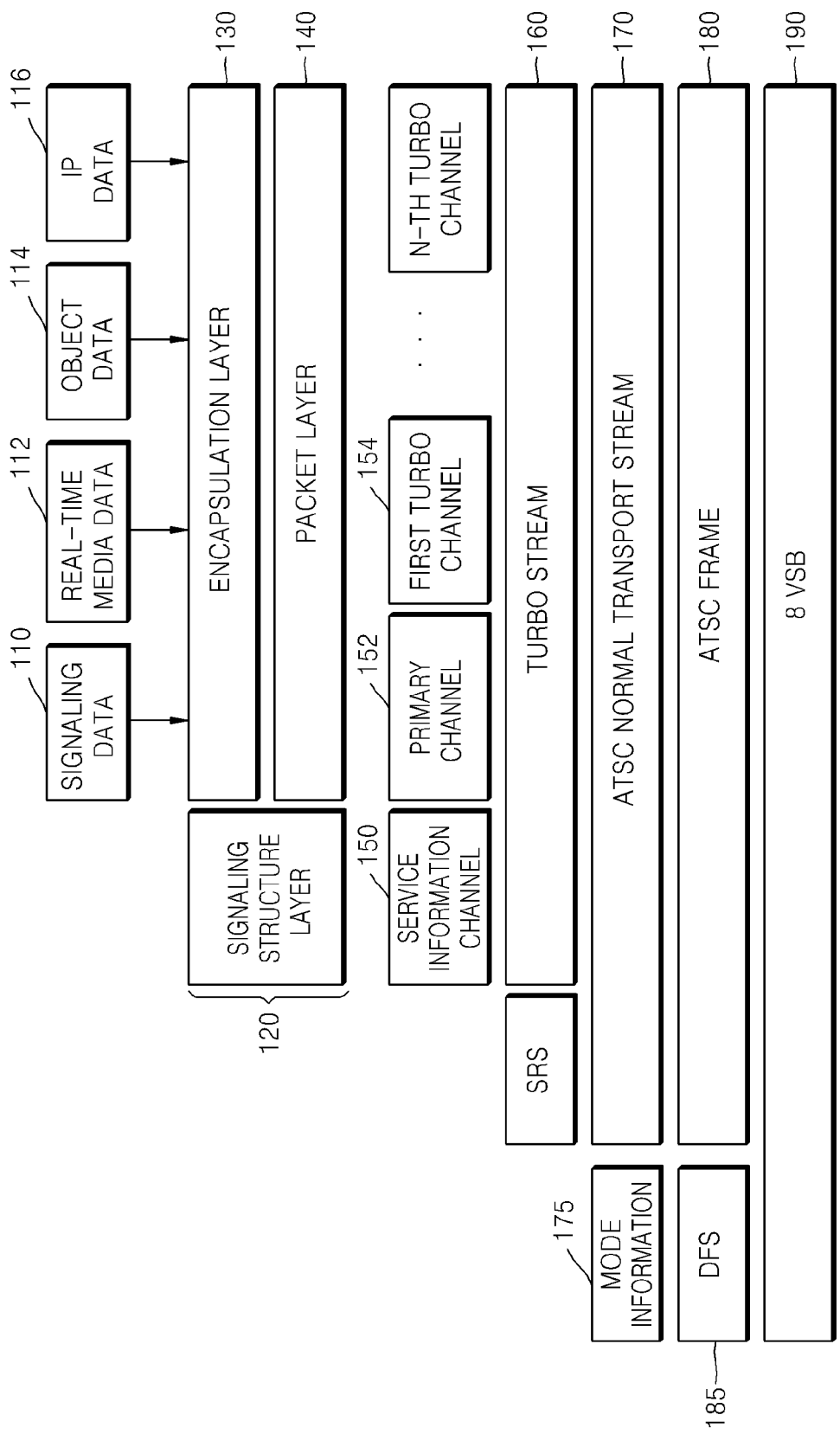
FIG. 1 illustrates an ATSC-mobile broadcasting (MCAST) (ATSC-MCAST) data protocol stack for a broadcasting service providing method according to an exemplary embodiment of the present invention.

FIG. 1 illustrates an ATSC-MCAST data protocol stack for a broadcasting service providing method according to an exemplary embodiment of the present invention.

The broadcasting service providing method according to the exemplary embodiment of FIG. 1 employs ATSC as a broadcasting service standard and MCAST as a mobile communications service standard. Accordingly, the broadcasting service providing method according to the exemplary embodiment of FIG. 1 proposes an ATSC-MCAST standard so that a mobile communications device can provide mobile broadcasting services by integrating existing broadcasting service standards together.

Application data including signaling data 110, real-time media data 112, object data 114, and IP data 116 are to be provided through broadcasting services. In the exemplary embodiment of FIG. 1, at least one application data may be provided.

A signaling structure layer 120 includes an encapsulation layer 130 and a packet layer 140. The signaling structure layer 120 provides a description of the application data and divides the application data. The encapsulation layer 130 generates an encapsulation packet that includes the application data and information about characteristics or configurations of the application data. The packet layer 140 segments the encapsulation packet into at least one transport packet. The transport packet includes the data of the encapsulation packet corresponding to the transport packet, information about characteristics or configurations of the encapsulation packet, and information about the transport packet itself.

A transport channel is a predetermined area of a transport stream and includes the transport packets formed in the signaling structure layer 120. The transport channel includes a primary channel 152 and at least one turbo channel 154. The primary channel 152 is selected as a default without a special channel search by a user so as to provide services. The turbo channel 154 is selected by a user's channel search so as to provide services. A service information channel (SIC) 150 is included in a transport packet at a predetermined area of the turbo channel 154 and includes information such as locations of the primary channel 152 and the turbo channel 154.

The transport packets are turned into a turbo stream 160, which is to be applied in advanced vestigial side band (A-VSB) transmission, by passing through the transport channel. The A-VSB turbo stream 160 is combined with a supplementary reference sequence (SRS) so as to turn into an ATSC normal transport stream 170, which is defined by mode information 175. The ATSC normal transport stream 170 is formed into an ATSC frame 180 which is defined by a data field sync (DFS) 185, and is transported via an 8-level VSB 190.

A method of receiving mobile broadcasting services according to the ATSC-MCAST standard illustrated in FIG. 1 will now be described in detail.

When the ATSC frame 180 generated according to the ATSC-MCAST standard is received, the location of the SIC 150 is ascertained by the DFS 185, and the SIC 150 is analyzed. Because the SIC includes information such as the number, configurations, etc. of transport channels, a desired transport channel can be accessed by the analysis of the SIC 150. Predetermined application data is obtained by processing the transport packets and encapsulation packet extracted from the accessed transport channel. In this way, broadcasting services are provided.

Figure 2A:
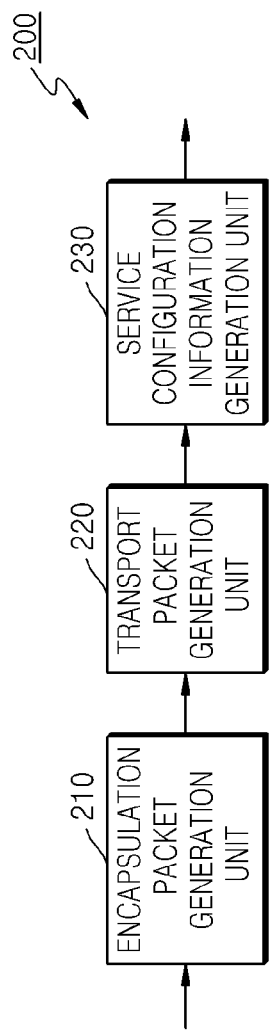
FIG. 2A is a block diagram of an apparatus for transporting mobile broadcasting services, according to an exemplary embodiment of the present invention.

FIG. 2A is a block diagram of an apparatus 200 for transporting mobile broadcasting services, according to an exemplary embodiment of the present invention.

The apparatus 200 includes an encapsulation packet generation unit 210, a transport packet generation unit 220, and a service configuration information generation unit 230.

The encapsulation packet generation unit 210 receives application data, generates an encapsulation packet that includes configuration information corresponding to the type of to-be-transported application data and the application data, and outputs the encapsulation packet to the transport packet generation unit 220.

The application data is one of signaling data, real-time media data, IP data, and object data. Depending on the type of application data, information about the encapsulation packet is set differently.

In particular, an encapsulation packet including real-time media data according to an exemplary embodiment of the present invention includes, in a header area, decoder configuration information (DCI) that determines a specification of a target decoder.

The transport packet generation unit 220 receives the encapsulation packet from the encapsulation packet generation unit 210, divides the encapsulation packet into at least one predetermined-sized transport packet that includes data of the encapsulation packet and information about the transport packet itself, and outputs the transport packet to the service configuration information generation unit 230.

According to an exemplary embodiment of the present invention, the transport packet generation unit 220 generates a transport packet that includes a basic header area, a pointer area, a padding area, a location map table (LMT) area, a linkage information table (LIT) area, and a payload area.

The service configuration information generation unit 230 receives the transport packet from the transport packet generation unit 220, generates service configuration information that includes set information about a channel including the transport packet, and outputs the service configuration information to an SIC (not shown) at a predetermined location from at least one transport channel on a transport stream.

According to an exemplary embodiment of the present invention, the service configuration information generation unit 230 includes a service configuration information determination unit for determining service configuration information that includes information about a turbo channel and frame group information.

The encapsulation packet generation unit 210, the transport packet generation unit 220, and the service configuration information generation unit 230 will be described in greater detail later with reference to FIGS. 3 through 10B.

Figure 2B:
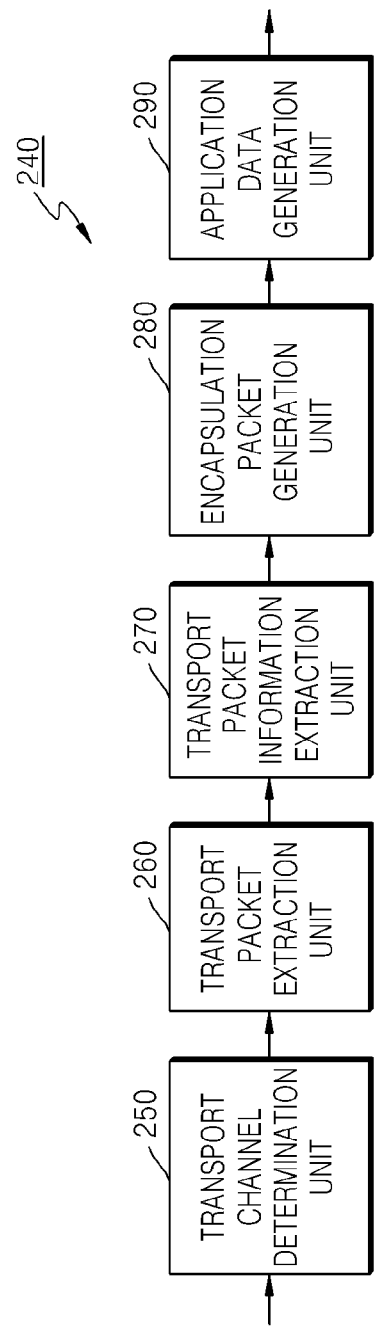
FIG. 2B is a block diagram of an apparatus for receiving mobile broadcasting services according to an exemplary embodiment of the present invention.

FIG. 2B is a block diagram of an apparatus 240 for receiving mobile broadcasting services according to an exemplary embodiment of the present invention. Referring to FIG. 2B, the apparatus 240 includes a transport channel determination unit 250, a transport packet extraction unit 260, a transport packet information extraction unit 270, an encapsulation packet generation unit 280, and an application data generation unit 290.

The transport channel determination unit 250 determines a predetermined transport channel by using service configuration information extracted from a service information channel at a predetermined location on a received frame, and outputs information about the determined transport channel to the transport packet extraction unit 260.

According to an exemplary embodiment of the present invention, information about a turbo channel and frame group information are extracted from the service configuration information.

The transport packet extraction unit 260 extracts a transport packet from the transport channel determined by the transport channel determination unit 250, and outputs the transport packet to the transport packet information extraction unit 270.

After extracting the transport packet from the transport channel, the transport packet information extraction unit 270 extracts transport packet information from the transport packet, and outputs the transport packet information to the encapsulation packet generation unit 280.

The encapsulation packet generation unit 280 receives the transport packet from the transport packet information extraction unit 260, generates an encapsulation packet including at least one transport packet by using the extracted transport packet information, and outputs the encapsulation packet to the application data generation unit 290.

In an exemplary embodiment of the present invention, basic configuration information, an LMT, an LIT, and a program clock reference (PCR) are extracted from the transport packet.

The application data generation unit 290 receives the encapsulation packet from the encapsulation packet generation unit 280, extracts encapsulation packet information from the encapsulation packet, and generates application data including at least one encapsulation packet by using the extracted encapsulation packet information.

The transport channel determination unit 250, the transport packet extraction unit 260, the encapsulation packet generation unit 280, and the application data generation unit 290 will now be described in greater detail with reference to FIGS. 3 through 10B.

FIG. 3 illustrates a relationship among application data, encapsulation packets, and transport packets. FIG. 3 also illustrates functions of the encapsulation packet generation unit 210 and the transport packet generation unit 220 of the apparatus 200 and functions of the encapsulation packet generation unit 280 and the application data generation unit 290 of the apparatus 240.

Referring to FIG. 3, the encapsulation packet generation unit 210 divides and encapsulates application data 310 so that the application data 310 confirms to the A-VSB transmission standard. The application data 310 is at least one of real-time media data, IP data, object data, signaling data, and so on.

In the exemplary embodiment illustrated in FIG. 3, the encapsulation packet generation unit 210 generates encapsulation packets 320, 324, . . . , and 327 having structures corresponding to the type of application data 310. Each of header areas 321, 325, . . . , and 328 of the encapsulation packets 320, 324, . . . , and 327 have different structures according to the type of application data included in their respective payload areas 323, 326, . . . , and 329.

The transport packet generation unit 220 divides the encapsulation packets 320, 324, . . . , and 327 into a plurality of 187-byte transport packets 330, 333, . . . , 336, . . . , and 340. The 187-byte transport packets 330, 333, . . . , 336, . . . , and 340 respectively include header areas 331, 334, . . . , 337, . . . , and 341 and payload areas 332, 335, . . . , 338, . . . , and 342. The payload areas 332, 335, . . . , 338, . . . , and 342 include data of the encapsulation packets 320, 324, . . . , and 327. The header areas 331, 334, . . . , 337, . . . , and 341 include information about the transport packets 330, 333, . . . , 336, . . . , and 340.

Figures 4A, 4B:
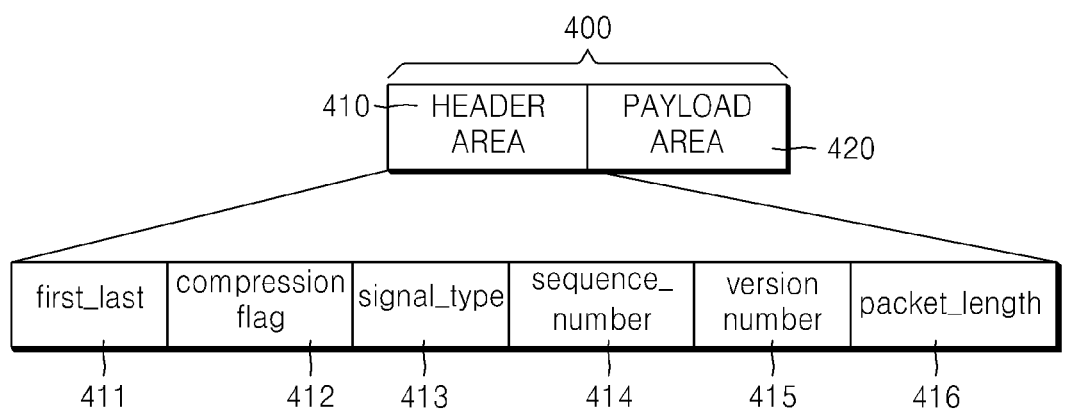
FIG. 4A illustrates a structure of an encapsulation packet for signaling data according to an exemplary embodiment of the present invention.
FIG. 4B illustrates a method of defining information about whether an encapsulation packet is the first or last packet.

FIG. 4A illustrates a structure of an encapsulation packet 400 for signaling data according to an exemplary embodiment of the present invention. Functions and roles of the encapsulation packet generation unit 210 of the transporting apparatus 200 and the application data generation unit 290 of the receiving apparatus 240 will also be described in detail hereinafter with reference to FIG. 4A.

Signaling data is located in a first packet of a turbo channel and includes information about sub-data channels that constitute the turbo channel.

The encapsulation packet 400 for signaling data includes a header area 410 and a payload area 420. The payload area 420 includes the signaling data.

The header area 410 includes a first_last area 411 specifying whether the encapsulation packet 400 is the first or last packet, a compression flag area 412 specifying whether the data included in the payload area 420 is compressed or not, a signal_type area 413 specifying the type of data included in the payload area 420, a sequence_number area 414 specifying a sequence number, a version_number area 415 specifying the version of the encapsulation packet 400 for signaling data, and packet_length information 416 specifying the total number of bytes of the payload area 420.

The sequence_number area 414 specifies a number which is granted to encapsulation packets including the same application data, and increments by 1 from 0 up to a maximum value and returns to 0 when the maximum value is reached. A sequence_number area to be described later performs the same function as the sequence_number area 414.

The version-number area 415, specifying the version number of the signaling encapsulation packet 400, increments by 1 whenever the data version of the payload area 420 of the encapsulation packet 400 changes.

FIG. 4B illustrates a method of defining the first_last area 411 specifying whether the encapsulation packet 400 is the first or last packet.

When the encapsulation packet 400 is neither the first packet nor the last packet among encapsulation packets of the same kind, the first_last area 411 is set to be 0. When the encapsulation packet 400 is the last packet among the encapsulation packets of the same kind, the first_last area 411 is set to be 1. When the encapsulation packet 400 is the first packet among the encapsulation packets of the same kind, the first_last area 411 is set to be 2. When the encapsulation packet 400 is the only packet, the first_last area 411 is set to be 3.

FIG. 4C illustrates a syntax of the encapsulation packet 400 for signaling data according to an exemplary embodiment of the present invention.

The encapsulation packet 400, ATSC_MCAST_Signaling_Encapsulation_Packet, includes first_last information, compression_flag information, signal_type information, sequence_number information, version_number information, packet_length information, and data_byte information.

FIG. 5A illustrates a structure of an encapsulation packet 500 for real-time media data according to an exemplary embodiment of the present invention.

The encapsulation packet 500 includes a header area 510, an additional header area 520, and a payload area 530. The payload area 530 includes the real-time media data.

In FIG. 5A, the encapsulation packet generation unit 210 includes, in the header area 510, a first_last area 511 specifying whether the encapsulation packet 500 is the first or last packet, an RT_type area 512 specifying the type of the real-time media data of the payload area 530 of the encapsulation packet 500, a DCI_flag area 513 specifying whether DCI is included in the DCI_field area 518, a DCI_version area 514 specifying the version of the DCI, an addition_flag area 515 specifying whether additional information is included in the additional header area 520, a reserved area 516 specifying reserved bits, a DCI_length area 517 specifying the number of bytes of the DCI, a DCI_field area 518 specifying the DCI, and a packet_length area 519 specifying the total number of bytes of the payload area 530.

The first_last area 511 performs the same function as the first_last information 411 illustrated in FIGS. 4A and 4B.

The DCI referred to in the DCI_flag area 513, the DCI_version area 514, the DCI_length area 517, and the DCI_field area 518 will be described later with reference to FIGS. 5C through 5E.

The reserved area 516, specifying the reserved bits, is reserved for future use. Reserved areas to be described later perform the same functions as the reserved area 516.

The additional header area 520 includes PTS_flag information 521 indicating whether a presentation time stamp (PTS) field is included, DTS_flag information 522 indicating whether a decoding time stamp (DTS) field is included, padding_flag information 523 indicating whether a padding field is included, scrambling_control information 524 indicating whether a scrambling mode is established in the payload area 53, PTS information 526, DTS information 527, padding_length information 528 indicating the number of bytes of the padding field, and padding_byte information 529 indicating the value of the padding field.

FIG. 5B illustrates a syntax of the encapsulation packet 500 for real-time media data according to an exemplary embodiment of the present invention.

The encapsulation packet 500, ATSC_MCAST_Real-Time_Encapsulation_Packet, includes the first_last information 511, the RT_type information 512, the DCI_flag information 513, the DCI_version information 514, the addition_flag information 515, the reserved information 516, the DCI_length information 517, the DCI_field information 518, and the packet_length information 519, which constitute the header area 510, and the PTS_flag information 521, the DTS_flag information 522, the padding_flag information 523, the scrambling_control information 524, the PTS information 526, the DTS information 527, the padding_length information 528, and the padding_byte information 529, which constitute the additional header area 520.

FIG. 5C illustrates a function of the DCI.

In order to provide real-time media data services, an existing broadcasting service system 530 should receive information such as program specific information (PSI) in advance in order to decode multimedia data. Accordingly, even when P-frame video data 532, audio data 533 and 534, and I-frame video data 535 are received after a service request 550 made by a user, the received multimedia data is not processed until PSI 536 is received. After the PSI 536 is received, another I-frame video data 537 is received and the already received multimedia data 532, 533, 534, and 535 are then processed together with the I-frame video data 537. In this way, services can be provided to users. Accordingly, the time when a broadcasting service is provided to a user is delayed by the length of a PSI reception interval.

On the other hand, in a broadcasting service system 540 according to an exemplary embodiment of the present invention, each multimedia elementary stream includes a decoder specific information (DSI) descriptor in the DCI. Accordingly, when a receiving device of the broadcasting service system 540 receives the I-frame video data 535, the receiving device processes the already-received multimedia data 532, 533, and 534 together with the I-frame video data 535 without needing to wait for PSI, so that the processed multimedia data can be provided as a broadcasting service to users.

FIG. 5D illustrates a structure of DCI according to an exemplary embodiment of the present invention.

In an exemplary embodiment of the present invention, an encapsulation packet for real-time media data includes DCI about the specification of a decoder.

A DCI_field area 560 includes a Content Type area 561 specifying the type of content, a Max Decoding Buffer Size area 562 specifying the length of a decoding buffer, a DSI length area 563 specifying the length of DSI, and a Decoder Specific Information area 564.

FIG. 5E illustrates a content type description according to an exemplary embodiment of the present invention. Referring to FIG. 5E, a value '1' is allocated to a content type conforming to an H.264/AVC standard, a value '2' is allocated to a content type conforming to an HEAAC standard, a value '0' is reserved for future content types to be added, and values '3' through '255' are determined according to a user's definition, that is, by to-be-determined (TBD).

Figure 6A:
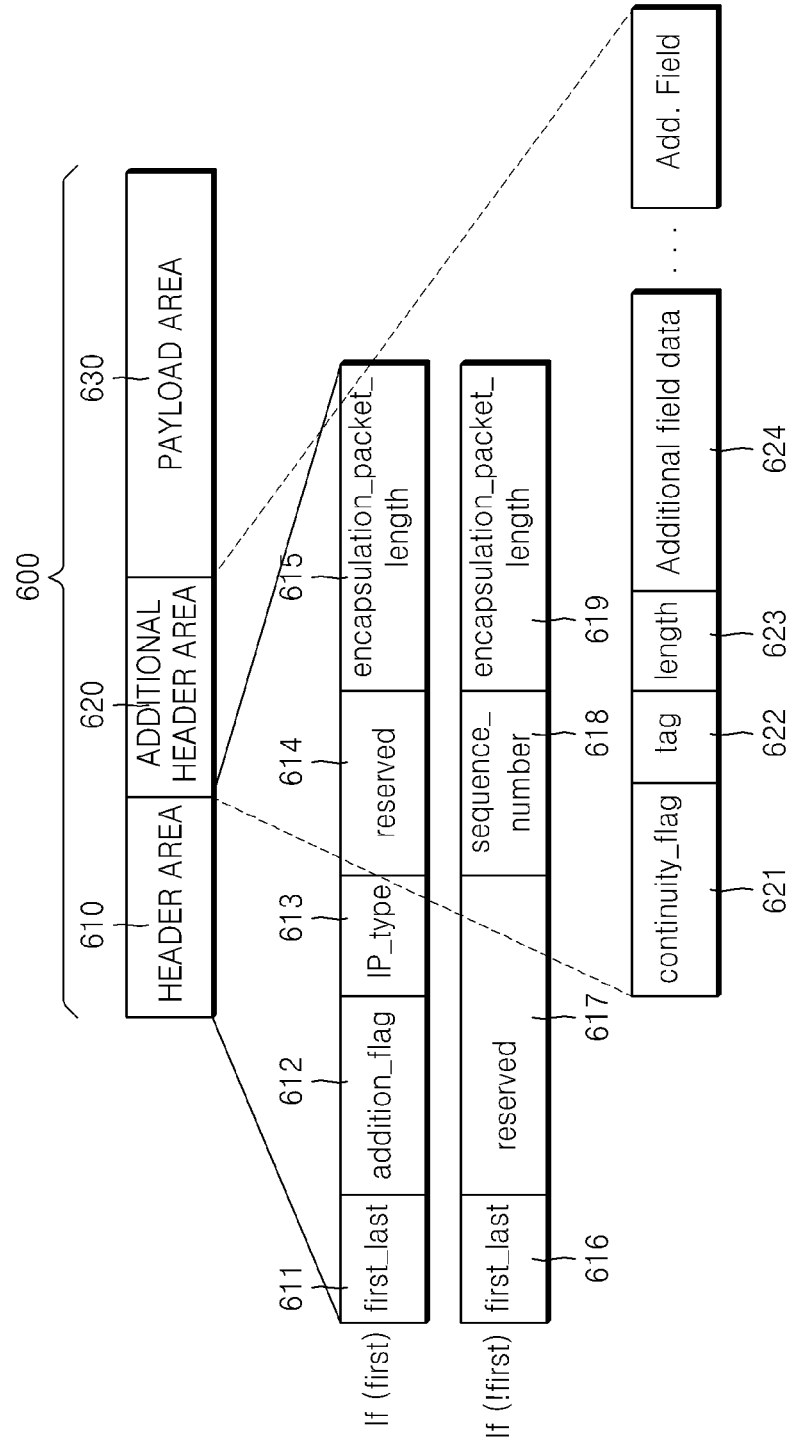
FIG. 6A illustrates a structure of an encapsulation packet for Internet Protocol (IP) data according to an exemplary embodiment of the present invention.

FIG. 6A illustrates a structure of an encapsulation packet 600 for IP data according to an exemplary embodiment of the present invention. Referring to FIG. 6A, the encapsulation packet 600 for IP data includes a header area 610, an additional header area 620, and a payload area 630. The payload area 630 includes the IP data.

If the encapsulation packet 600 for IP data is the first packet, the header area 610 includes first_last information 611 specifying whether the encapsulation packet 600 is the first or last packet, an addition_flag 612 specifying whether an additional field is included in the header area 610, IP_type information 613 specifying the type of IP data in the payload area 630 of the encapsulation packet 600, reserved information 614 specifying reserved bits, and encapsulation_packet_length 615 specifying the number of bytes of the encapsulation packet 600.

If the encapsulation packet 600 for IP data is not the first packet, the header area 610 includes first_last information 616 specifying whether the encapsulation packet 600 is the first or last one, reserve information 617 specifying reserved bits, sequence_number 618 specifying a sequence number, and encapsulation_packet_length 619 specifying the number of bits of the encapsulation packet 600.

The additional header area 620 includes a continuity_flag 621 specifying whether the next additional field exists in the additional header area 620, tag 622 specifying the type of additional header area 620, length 623 specifying the number of bytes of the additional field, and additional field data 624.

FIG. 6B illustrates a syntax of the encapsulation packet 600 for IP data according to an exemplary embodiment of the present invention. Referring to FIG. 6B, the encapsulation packet 600, ATSC_MCAST_IP_Encapsulation_Packet, includes the first_last information 611 and 616, the addition_flag 612, the IP_type 613, the reserved information 614 and 617, the encapsulation_packet_length 615 and 619, the sequence_number 618, which constitute the header area 610, and the continuity_flag 621, the tag 622, the length 623, and the additional field data 624, which constitute the additional header area 620.

FIG. 7A illustrates a structure of an encapsulation packet 700 for object data according to an exemplary embodiment of the present invention. Referring to FIG. 7A, the encapsulation packet 700 for object data includes a header area 710, an additional header area 730, and a payload area 740. The payload area 740 includes the object data.

At least one object data can be transported through a single sub-data channel. Accordingly, when object data is consecutively transported through the sub-data channel, other object data can also be transported through the sub-data channel. Thus, identification of successive object data is needed.

If the encapsulation packet 700 is the first one, the header area 710 includes first_last information 711 specifying whether the encapsulation packet 700 is the first or last packet, an addition_flag 712 specifying whether an additional field is included in the header area 710, reserved information 713 specifying reserved bits, object_ID 714 specifying the identifier of the object data in the payload area 730 of the encapsulation packet 700, object_type information 715 specifying the type of object data, reserved information 716 specifying reserved bits, and packet_length 717 specifying the number of bytes of the encapsulation packet 700.

If the encapsulation packet 700 is not the first one, the header area 710 includes first_last information 721 specifying whether the encapsulation packet 700 is the first or last packet, an addition_flag 722 specifying whether an additional field is included in the header area 710, reserved information 723 specifying reserved bits, sequence_number 724 specifying a sequence number, reserved information 725 specifying reserved bits, and packet_length 726 specifying the number of bytes of the encapsulation packet 700.

The additional header area 730 includes a continuity_flag 731 specifying whether the next additional field exists in the additional header area 730, a tag 732 specifying the type of additional field, length 733 specifying the number of bytes of the additional field, and additional field data 734.

FIG. 7B illustrates a syntax of the encapsulation packet 700 for object data, according to an exemplary embodiment of the present invention. Referring to FIG. 7B, the encapsulation packet 700, ATSC_MCAST_Object Encapsulation_Packet, includes first_last information 711 and 721, addition_flags 712 and 722, reserved information 713, 716, 723, and 725, object_ID 714, object type information 715, sequence_number 724, packet_length 717 and 726, which constitute the header area 710, and a continuity_flag 731, tag 732, length 733, and addition field data 734, which constitute the additional header area 730.

FIG. 8A illustrates a structure of a basic header field of a transport packet 800 according to an exemplary embodiment of the present invention. Referring to FIG. 8A, the transport packet 800 includes a base header field 810, a program clock reference (PCR) field 860, a pointer field 820, a padding field 830, an LMT field 840, an LIT field 850, and a payload field 860.

The base header field 810 includes first_last information 811 specifying whether an encapsulation packet is the first or last packet, PCR_flag information 817 specifying whether a PCR field is included, DC_flag information 812 specifying whether a DCI field of a header area of the encapsulation packet is included, pointer_flag information 813 specifying whether the pointer field 820 is included, padding_flag information 814 specifying whether the padding field 830 is included, LMT_flag information 815 specifying whether the LMT field 840 is included, and LIT_flag information 816 specifying whether the LIT field 850 is included.

The pointer field 820 specifies the location of the payload field 870 of the transport packet 800.

FIG. 8B illustrates a structure of the padding field 830 of the transport packet 800 according to an exemplary embodiment of the present invention. Referring to FIG. 8B, the padding field 830 includes padding_length information 831 indicating the number of bytes of the padding field 830 and padding_byte information 832 indicating the value of the padding field 830.

Figure 8C:
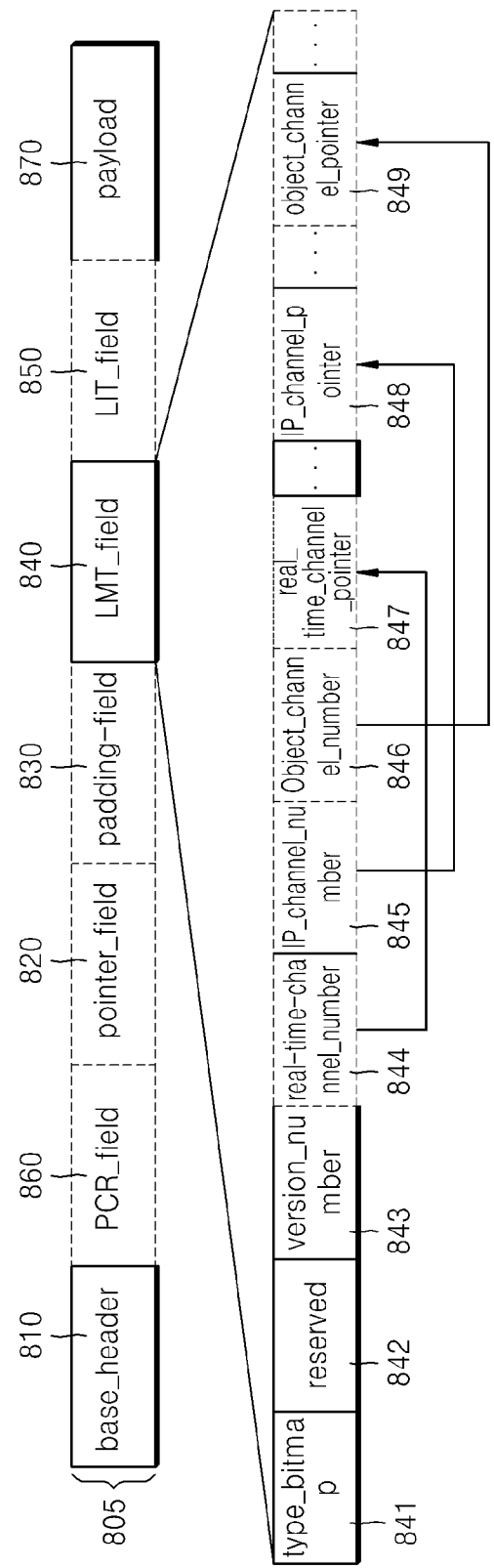
FIG. 8C illustrates a structure of a location map table (LMT) field of the transport packet illustrated in FIG. 8A, according to an exemplary embodiment of the present invention.

FIG. 8C illustrates a structure of the LMT field 840 of the transport packet 800 according to an exemplary embodiment of the present invention. Referring to FIG. 8C, the LMT field 840 includes type_bitmap information 841 indicating the type of application data in the transport packet 800, reserved information 842 specifying reserved bits, version_number information 843 indicating the version of an LMT, real_time_channel_number information 844 indicating the number of sub-data channels for real-time media data among data channels, real_time_channel_pointer information 847 indicating the locations of the sub-data channels for the real-time media data, IP_channel_number information 845 indicating the number of sub-data channels for IP data, IP_channel_pointer information 848 indicating the locations of the sub-data channels for IP data, Object_channel_number information 846 indicating the number of sub-data channels for object data, and Object_channel_pointer information 849 indicating the locations of the sub-data channels for object data.

Roles of the LMT will be described in detail later with reference to FIGS. 9A and 9B.

Figure 8D:
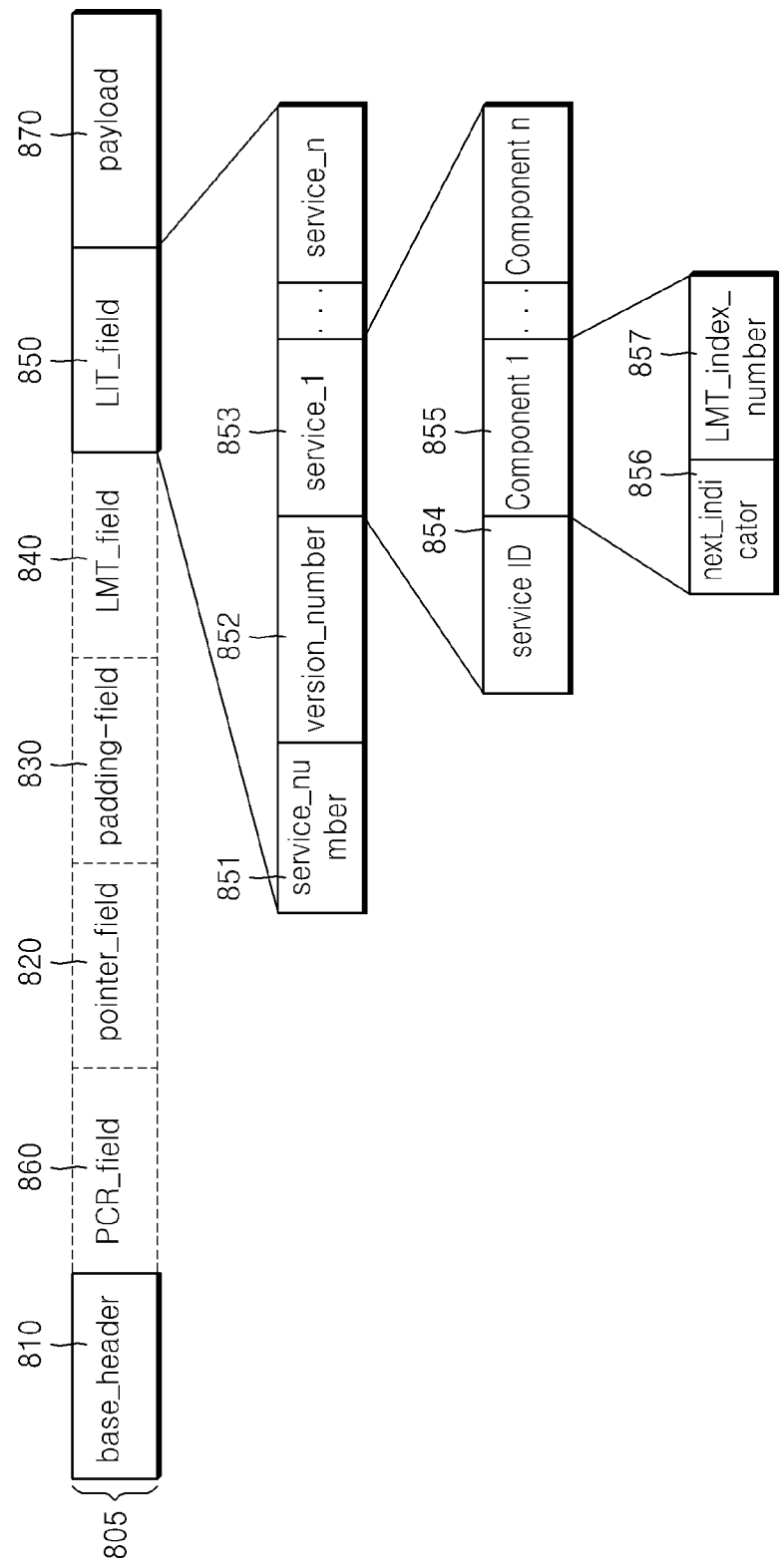
FIG. 8D illustrates a structure of a linkage information table (LIT) field of the transport packet illustrated in FIG. 8A, according to an exemplary embodiment of the present invention.

FIG. 8D illustrates a structure of the LIT field 850 of the transport packet 800 according to an exemplary embodiment of the present invention. Referring to FIG. 8D, the LIT field 850 includes service_number information 810 indicating the number of services that can be provided through a current data channel, version_number information 852 indicating the version of an LIT, and service_1 through service_n information 853 indicating at least one service.

Each of the service_1 through service_n information 853 includes service ID information 854 indicating an ID of a service through a channel, and Component 1 through Component n information 855 indicating at least one component of the service.

Each of the Component 1 through Component n information 855 includes next_indicator information 856 indicating existence or nonexistence of the next pointer, and LMT_index_number information 857 indicating an index number of an LMT.

Roles of the LIT will be described in detail later with reference to FIGS. 9A and 9C.

FIG. 8E illustrates a syntax of the transport packet 800 according to an exemplary embodiment of the present invention. Referring to FIG. 8E, the transport packet 800, ATSC_MCAST_Transport_Packet, includes the first_last information 811, the DC_flag information 812, the pointer_flag information 813, the padding_flag information 814, the LMT_flag information 815, the LIT_flag information 816, and the PCR_flag information 817, which constitute the base header field 810. The transport packet ATSC_MCAST_Transport_Packet further includes the pointer field 820, the padding_length information 831, and the padding_byte information 832. The padding_length information 831 and the padding_byte information 832 constitute the padding field 830.

The transport packet ATSC_MCAST_Transport_Packet further includes the type_bitmap information 841, the reserved information 842, the version_number information 843, the real_time_channel_number information 844, the real_time_channel_pointer information 847, the IP_channel_number information 845, the IP_channel_pointer information 848, the Object_channel_number information 846, and the Object_channel_pointer information 849, which constitute the LMT field 840.

The transport packet ATSC_MCAST_Transport_Packet further includes the service_number information 851, the version_number information 852, the service ID information 854, the next_indicator information 856, and the LMT_index_number information 857, which constitute the LIT field 850. Index_number denotes a sequence number of an elementary channel corresponding to a service.

Figure 9A:
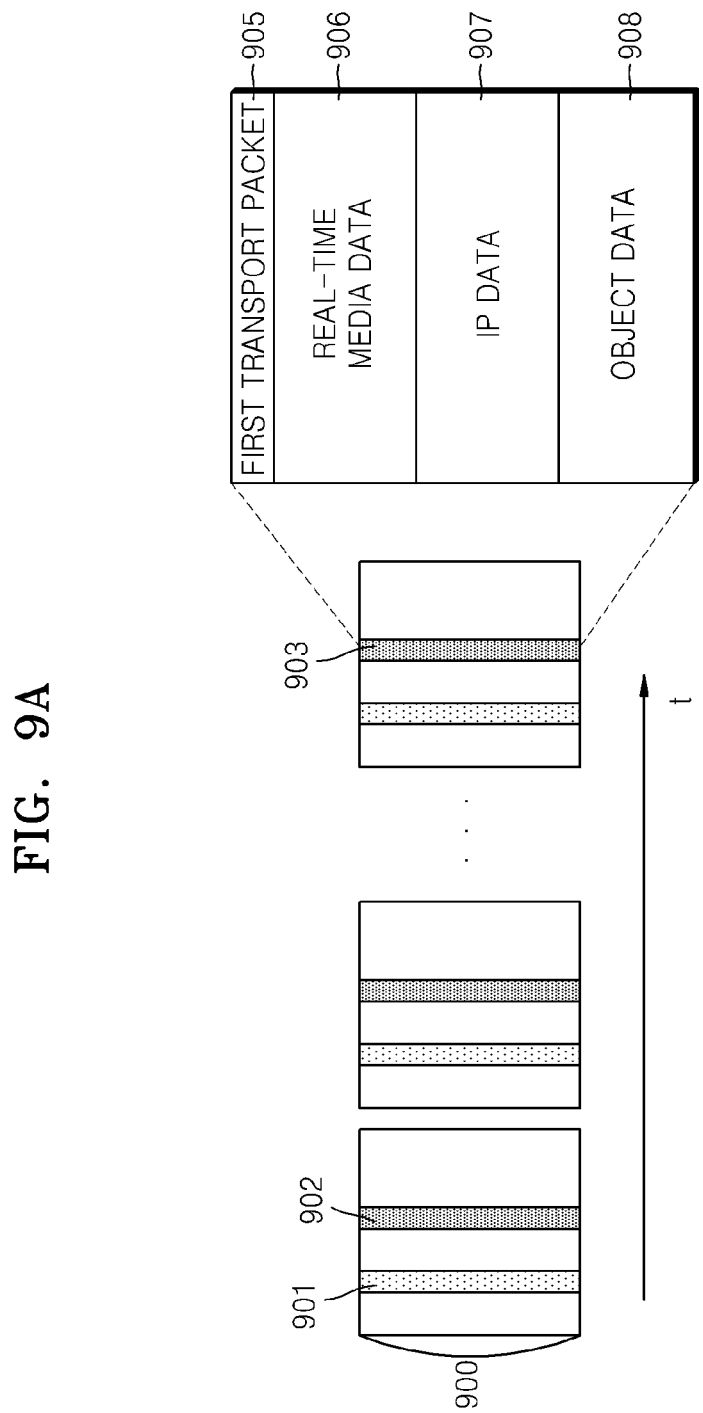
FIG. 9A illustrates a method of multiplexing all turbo channels.

FIG. 9A illustrates a method of multiplexing all turbo channels. Referring to FIG. 9A, a transport frame 900 includes a plurality of transport channels, namely, a service information channel and turbo channels 901, 902, and 903. Each turbo channel includes at least one sub-data channel, each of which includes at least one transport packet. In an exemplary embodiment of the present invention, a sub-data channel of an ATSC transport frame includes 188-byte MCAST transport packets.

A first transport packet 905 of the turbo channel 903 includes an LMT or an LIT. Each of a sub-data channel 906 including real-time media data, a sub-data channel 907 including IP data, and a sub-data channel 908 including object data includes at least one transport packet.

In the exemplary embodiment of the present invention, relations between sub-data channels on a turbo channel and transport packets are defined in an LMT and an LIT, so that a packet including the data of a desired broadcasting service can be quickly and efficiently accessed.

Figure 9B:
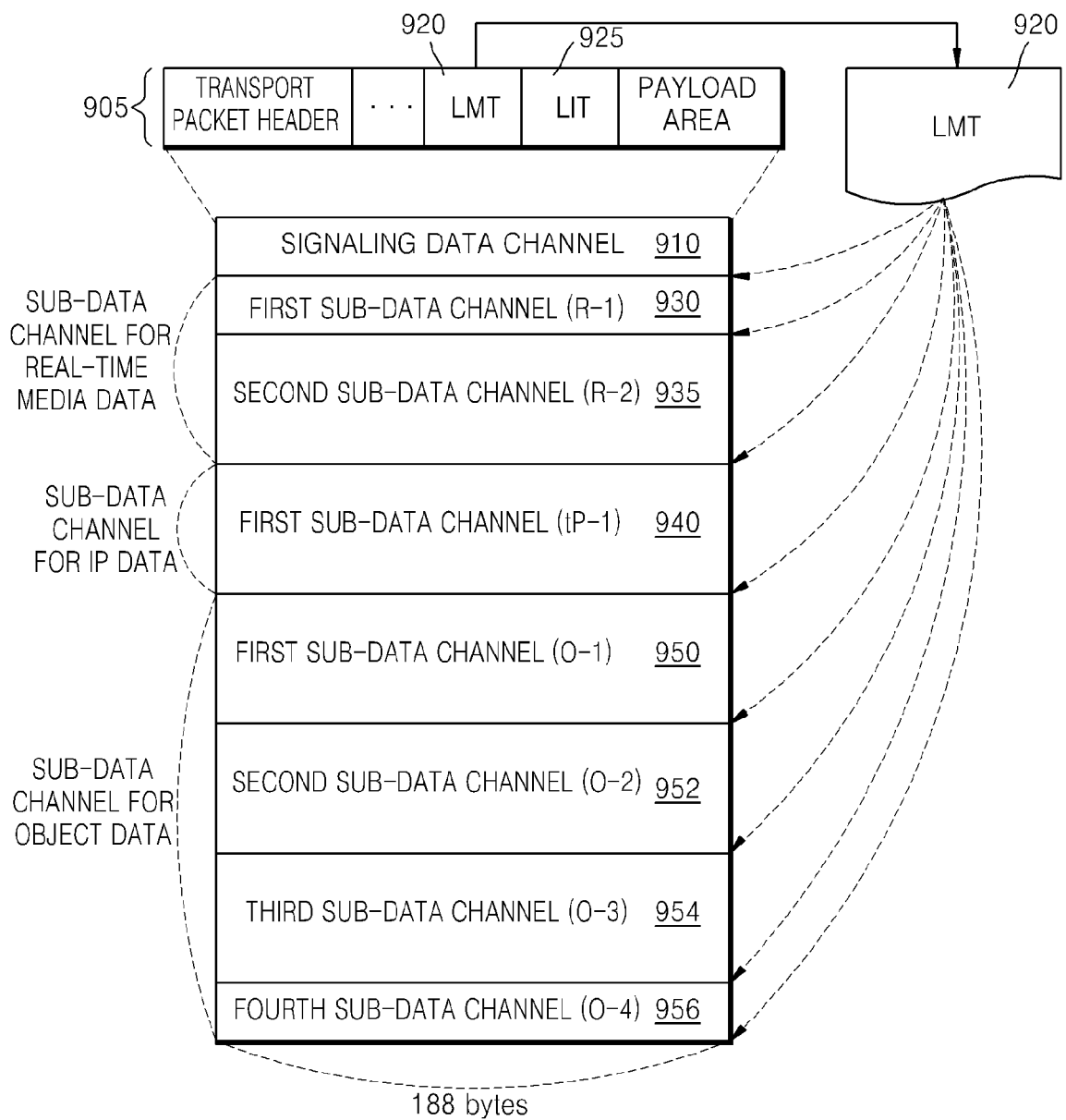
FIG. 9B illustrates a structure of an LMT according to an exemplary embodiment of the present invention.

FIG. 9B illustrates a structure of an LMT according to an exemplary embodiment of the present invention. Referring to FIG. 9B, a signaling data channel 910 of a turbo channel includes the first transport packet 905 of a turbo channel. The first transport packet 905 includes an LMT 920 and an LIT 925. The turbo channel includes a signaling data channel 910, sub-data channels 930 and 935 including real-time media data, a sub-data channel 940 including IP data, and sub-data channels 950, 952, 954, and 956 including object data.

The LMT 920 provides the locations of all of the sub-data channels 930, 935, 940, 950, 952, 954, and 956 and the numbers thereof The LMT 920 may be included in each frame. However, if the locations of service components of each frame are fixed, the LMT may not be needed.

Figure 9C:
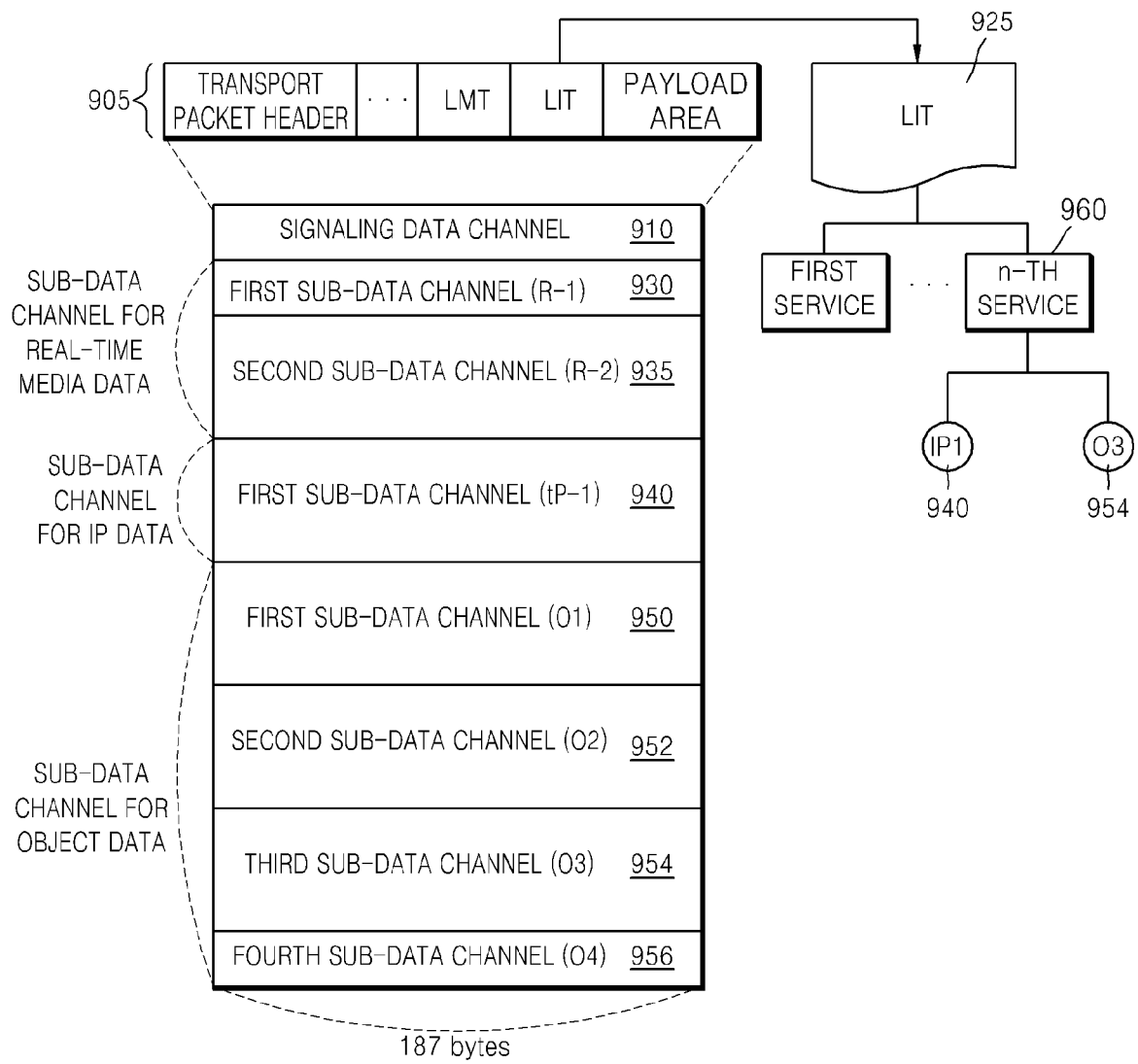
FIG. 9C illustrates a structure of an LIT according to an exemplary embodiment of the present invention.

FIG. 9C illustrates a structure of the LIT 925 according to an exemplary embodiment of the present invention. Referring to FIG. 9C, the LIT 925 specifies service components and provides the number of sub-data channels and IDs thereof. More specifically, the LIT 925 specifies a list of service components of each service 960 and provides relations among sub-data packets including the service components. Similar to the LMT 920, the LIT 925 may be included in each frame or may not be needed in some cases.

A SIC is located in a predetermined channel of a turbo stream. The SIC specifies the locations and characteristics of transport channels on the turbo stream, such as, the SIC, a primary channel, a turbo channel, etc., so that a transport channel including the data of a necessary service can be quickly accessed.

In an exemplary embodiment of the present invention, the SIC includes service configuration information in order to specify the characteristics or configurations of turbo services being provided or turbo channels.

FIG. 10A illustrates a syntax of service configuration information according to an exemplary embodiment of the present invention. In FIG. 10A, a turbo_channel_information_flag indicates whether turbo channel information is included, turbo_channel_information indicates the turbo channel information, an additional_service_information_flag indicates whether additional description information about a turbo service is included, and additional_service_information indicates additional description information about each turbo channel.

In addition, frame_group_information indicates information about a frame group, and version_indicator_information indicates the version of the service configuration information. CRC indicates that a cyclic redundancy check (CRC) value is included in the service configuration information.

FIG. 10B illustrates a syntax of the version_indicator_information illustrated in FIG. 10A, according to an exemplary embodiment of the present invention. In FIG. 10B, frame_counter indicates the number of times that the service configuration information has changed. When a frame is received, the service configuration information changes.

In addition, version indicates the version number of the service configuration information. When the structure of the service configuration information changes once, the value of version increments by 1.

Accordingly, an accurate location to which a frame is changed later and a change of the version of the service configuration information can be ascertained from the service configuration information.

FIG. 10C illustrates a syntax of frame_group_information illustrated in FIG. 10A, according to an exemplary embodiment of the present invention.

A frame group includes frames generated by frame slicing. When the frames are sequentially numbered and the sequentially numbered frames are periodically generated, the frame group is periodically formed by including the sequentially-numbered frames that are periodically generated. The frame slicing is a technique of dividing transport data corresponding to a single service into at least one frame and transporting the transport data on a frame-by-frame basis.

In FIG. 10C, current_frame_number indicates the number of a current frame from a frame group, and total_frame_number indicates the total number of frames included in the frame group.

FIG. 10D illustrates a syntax of turbo_channel_information illustrated in FIG. 10A, according to an exemplary embodiment of the present invention.

Whether the frame slicing technique has been performed or not and the total number of turbo channels are key factors in physical decoding information. When the frame slicing is supported, a current frame number and the number of frame blocks which have been received are needed for a selected turbo channel.

In FIG. 10D, version indicates the version of turbo channel information. Whenever a turbo channel changes, the value of version increments by 1. When the version is changed, the structure of the turbo channel information should be transported in advance.

Turbo_svc indicates the total number of turbo services in an A-VSB system, and turbo_svc_id indicates an ID of a current turbo service.

Is_enhanced indicates whether basic or high-level video scaling of data is supported.

MCAST_Frame_Slicing_flag indicates whether a current turbo stream is transported in a burst mode, Start_frame_number indicates the start frame number of the current turbo service, and Frame_block_number indicates the number of frames required to get the current turbo service.

Figure 11A:
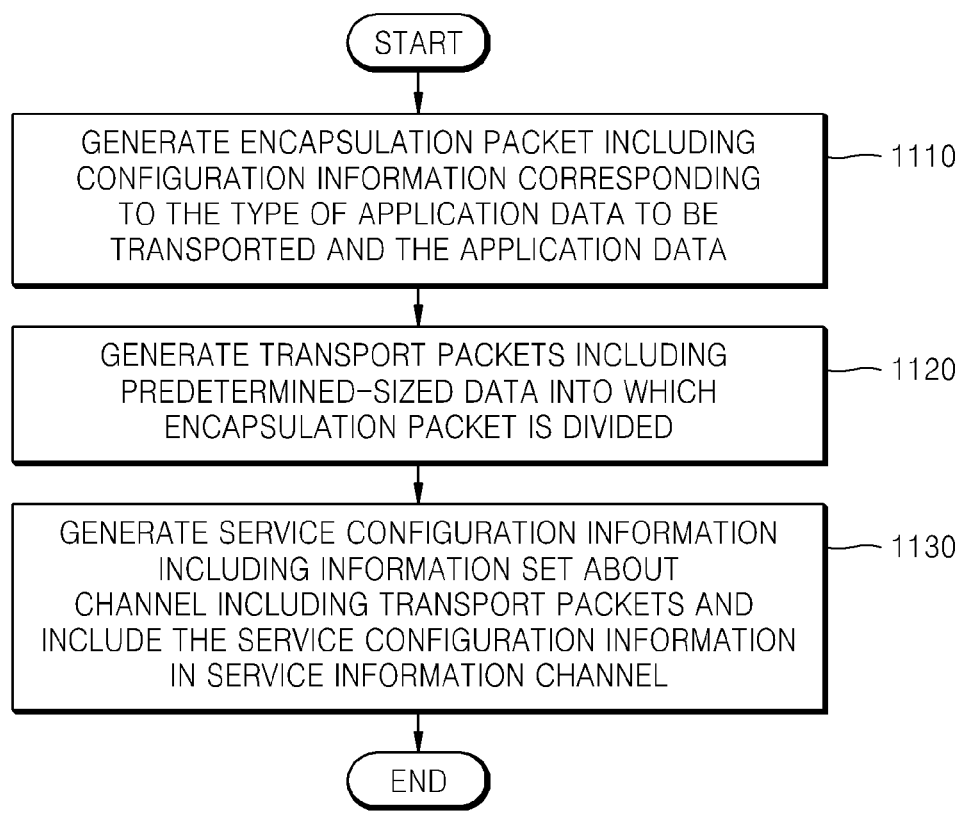
FIG. 11A is a flowchart of a method of transporting mobile broadcasting services, according to an exemplary embodiment of the present invention.

FIG. 11A is a flowchart of a method of transporting mobile broadcasting services according to an exemplary embodiment of the present invention;

In operation 1110, an encapsulation packet including configuration information corresponding to the type of application data to be transported and the application data is generated.

In operation 1120, transport packets including predetermined-sized data into which the encapsulation packet is divided are generated. The transport packets include information about the structure of the transport packets.

In operation 1130, service configuration information including information set about a channel including the transport packets is generated and included in a SIC at a predetermined location on a transport stream from among at least one transport channel on the transport stream.

Figure 11B:
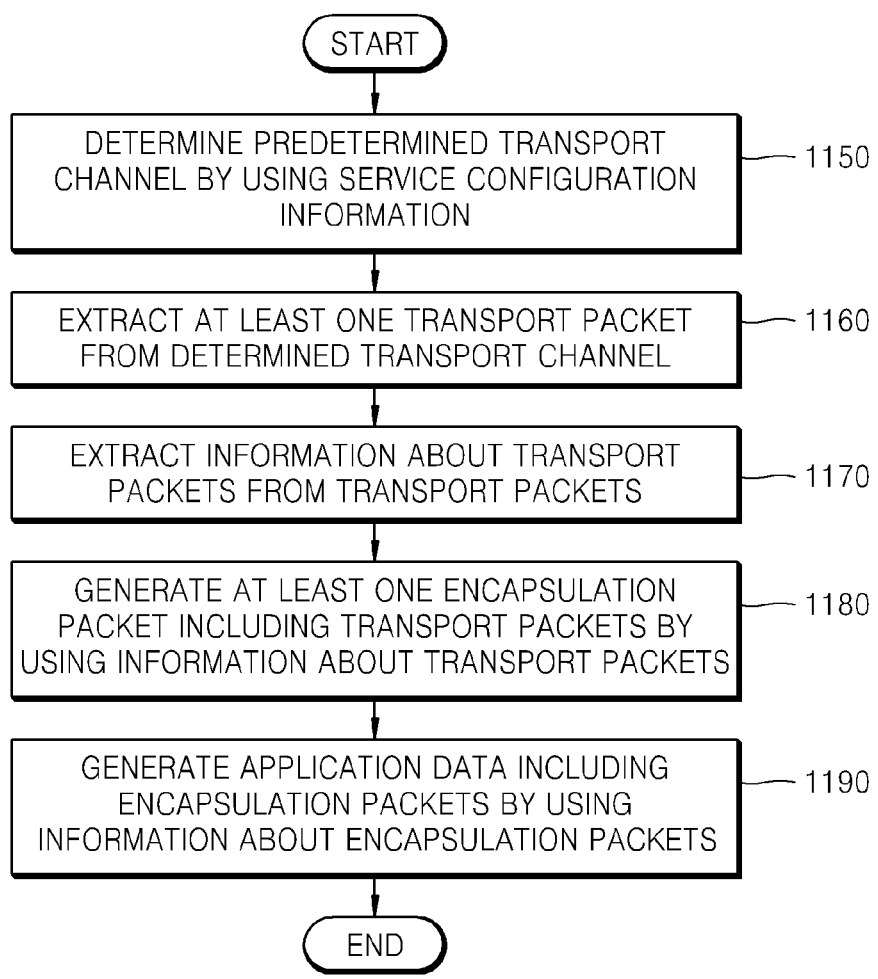
FIG. 11B is a flowchart of a method of receiving mobile broadcasting services, according to an exemplary embodiment of the present invention.

FIG. 11B is a flowchart of a method of receiving mobile broadcasting services according to an exemplary embodiment of the present invention.

In operation 1150, a predetermined transport channel is determined using service configuration information extracted from a SIC.

In operation 1160, at least one of the transport packets are extracted from the determined transport channel.

In operation 1170, information about the transport packets are extracted from the transport packets.

In operation 1180, at least one encapsulation packet including the transport packets is generated using the information about the transport packets.

In operation 1190, application data including the encapsulation packets is generated using information about the encapsulation packets which is extracted from the encapsulation packets.

The exemplary embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), and optical recording media (e.g., CD-ROMs, or DVDs).

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of transporting mobile broadcasting services, the method comprising:
    generating an encapsulation packet comprising configuration information corresponding to a type of application data to be transported and the application data;
    generating transport packets comprising data of predetermined-sized parts into which the encapsulation packet is divided, wherein the transport packets further comprise information about structures of the transport packets; and
    generating service configuration information comprising information set about channels including the transport packets, and transmitting the service configuration information in a service information channel at a predetermined location on at least one transport channel on a transport stream,
    wherein the transport channel is a data area at a predetermined location within a transport frame,
    wherein the information about the structures of the transport packets comprises at least one of basic configuration information, a location map table, and a linkage information table, and
    wherein the service configuration information comprises at least one of information about a turbo channel, and information about a frame group.

2. The method of claim 1, further comprising:
    generating the transport stream with data of the at least one transport channel; and
    generating and transporting a frame including the transport stream.

3. The method of claim 1, wherein:
    if the application data is real-time media data, the generating the encapsulation packet comprises inserting decoder configuration information in the encapsulation packet; and
    the decoder configuration information comprises at least one of a content type, a decoding buffer length, a length of decoder specification information, and the decoder specification information.

4. The method of claim 1, wherein if the application data is signaling data, the generating the encapsulation packet comprises inserting, in the encapsulation packet, at least one of information indicating whether the encapsulation packet is a first packet or a last packet, information indicating whether data included in a payload area of the encapsulation packet is compressed, information indicating a type of data in the payload area, sequence number information, information indicating a version of a signaling encapsulation packet, and information indicating a total number of bytes of the payload area.

5. The method of claim 1, wherein:
    when the application data is Internet Protocol (IP) data, the generating the encapsulation packet comprises including, in the encapsulation packet, information indicating whether the encapsulation packet is a first packet or the last packet;
    when the encapsulation packet is the first packet, the generating the encapsulation packet further comprises including in the encapsulation packet at least one of information indicating whether additional data is included, information indicating a type of IP data in a payload area of the encapsulation packet, information specifying reserved bits, and information indicating a number of bytes of the encapsulation packet in addition to the information indicating whether the encapsulation packet is the first packet or the last packet; and
    if the encapsulation packet is not the first packet, the generating the encapsulation packet comprises further including in the encapsulation packet at least one of information specifying reserved bits, information specifying a sequence number, and information indicating the number of bytes of the encapsulation packet in addition to the information indicating whether the encapsulation packet is the first packet or the last packet.

6. The method of claim 1, wherein:
    if the application data is object data, the generating the encapsulation packet comprises including in the encapsulation packet at least one of information indicating whether the encapsulation packet is the first packet or the last packet and information indicating whether additional data is included;
    if the encapsulation packet is the first packet, the generating the encapsulation packet comprises further including in the encapsulation packet at least one of information specifying reserved bits, information indicating an identification number of object data in a payload area of the encapsulation packet, information indicating a type of object data, and information indicating a number of bytes of the encapsulation packet in addition to the information indicating whether the encapsulation packet is the first packet or the last packet and the information indicating whether the additional data is included; and
    if the encapsulation packet is not the first packet, the generating the encapsulation packet further comprises including in the encapsulation packet at least one of information specifying reserved bits, information indicating a sequence number, and information indicating the number of bytes of the encapsulation packet in addition to the information indicating whether the encapsulation packet is the first packet or the last packet and the information indicating whether the additional data is included.

7. The method of claim 1, wherein:
    in the generating the transport packets, the information about the transport packets comprises the basic configuration information; and
    the basic configuration information comprises at least one of information indicating whether decoder configuration information of the encapsulation packet is included, information indicating whether a location map table of the transport packets is included, information indicating whether a linkage information table of the transport packets is included, and information indicating whether a program clock reference (PCR) of the transport packets is included.

8. The method of claim 1, wherein:
    in the generating the transport packets, the information about the transport packets comprises the location map table; and
    the location map table comprises at least one of information indicating a type of application data of the transport packet, information indicating a version of the location map table, information indicating a number of sub-data channels for real-time media data from among data channels, information indicating locations of the sub-data channels for the real-time media data, information indicating a number of sub-data channels for IP data, information indicating locations of the sub-data channels for IP data, information indicating a number of sub-data channels for object data, and information indicating locations of the sub-data channels for object data.

9. The method of claim 1, wherein:
in the generating the transport packets, the information about the transport packets comprises the linkage information table;
the linkage information table comprises at least one of information indicating a number of services that can be provided through a current transport channel, information indicating a version of the linkage information table, and information indicating at least one service;
the information indicating at least one service comprises at least one of information indicating the identifications (IDs) of the at least one service through the current transport channel and information indicating at least one component of each of the services; and
the information indicating at least one component comprises at least one of information indicating whether a next pointer exists and information indicating an index number of a location map table.

10. The method of claim 1, wherein:
the generating the service configuration information comprises including information about the turbo channel in the service configuration information;
the information about the turbo channel comprises at least one of information indicating a version of the turbo channel information, information indicating a total number of turbo services, information indicating an identification (ID) of a current turbo service, information indicating a start location of a turbo stream, information indicating an index of a turbo channel length, information indicating a coding rate of the turbo channel, information indicating a number of a start frame of the current turbo service, and information indicating a number of frames required to get the current turbo service; and
the service information channel is located in a transport channel located at a predetermined location on the transport stream from among the at least one transport channels on the transport stream, and the turbo channel is located in a transport channel other than the service information channel.

11. The method of claim 1, wherein:
the generating the service configuration information comprises including information about the frame group in the service configuration information, wherein the information about the frame group comprises at least one of information indicating a number of a current frame in a current frame group and information indicating the total number of frames included in the current frame group; and
if the service configuration information is changed, the service configuration information is updated and a version number of the service configuration information is changed.

12. An apparatus for transporting mobile broadcasting services, comprising:
an encapsulation packet generation unit which generates an encapsulation packet comprising configuration information corresponding to a type of application data to be transported and the application data;
a transport packet generation unit which generates transport packets comprising data of predetermined-sized parts into which the encapsulation packet is divided, wherein the transport packets further comprise information about structures of the transport packets; and
a service configuration information generation unit which generates service configuration information including information about channels including the transport packets, and transmits the service configuration information in a service information channel at a predetermined location from at least one transport channel on a transport stream, wherein the transport channel is a data area at a predetermined location within a transport frame,
wherein the information about the structures of the transport packets comprises at least one of basic configuration information, a location map table, and a linkage information table, and
wherein the service configuration information comprises at least one of information about a turbo channel, and information about a frame group.

13. The apparatus of claim 12, further comprising:
a transport stream generation unit which generates a transport stream with the data of the transport channels; and
a transporting unit which generates and transports a frame including the transport stream.

14. The apparatus of claim 12, wherein:
if the application data is real-time media data, the encapsulation packet generation unit generates an encapsulation packet which comprises decoder configuration information, wherein the decoder configuration information comprises at least one of a content type, a decoding buffer length, a length of decoder specification information, and the decoder specification information;
if the application data is signaling data, the encapsulation packet generation unit generates an encapsulation packet which comprises at least one of information indicating whether the encapsulation packet is a first packet or a last packet, information indicating whether data included in a payload area of the encapsulation packet is compressed, information indicating a type of data in the payload area, sequence number information, information indicating a version of the signaling encapsulation packet, and information indicating a total number of bytes of the payload area;
if the application data is Internet Protocol (IP) data and the encapsulation packet is the first packet, the encapsulation packet generation unit generates an encapsulation packet which comprises at least one of information indicating whether additional data is included, information indicating a type of IP data in the payload area of the encapsulation packet, information specifying reserved bits, and information indicating a number of bytes of the encapsulation packet;
if the application data is IP data and the encapsulation packet is not the first packet, the encapsulation packet generation unit generates an encapsulation packet which comprises at least one of information specifying reserved bits, information indicating a sequence number, and information indicating the number of bytes of the encapsulation packet;
if the application data is object data and the encapsulation packet is the first packet, the encapsulation packet generation unit generates an encapsulation packet which comprises at least one of information specifying reserved bits, information indicating an identification number of object data in the payload area of the encapsulation packet, information indicating a type of object data, and information indicating the number of bytes of the encapsulation packet; and
if the application data is object data and the encapsulation packet is not the first packet, the encapsulation packet generation unit generates an encapsulation packet which comprises at least one of information specifying reserved bits, information indicating a sequence number, and information indicating the number of bytes of the encapsulation packet.

15. The apparatus of claim 12, wherein:
the transport packet generation unit generates transport packets including at least one of the basic configuration information, the location map table, the linkage information table, and a program clock reference;
the basic configuration information comprises at least one of information indicating whether the decoder configuration information is included, information indicating whether the location map table is included, information indicating whether the linkage information table is included, and information indicating whether the program clock reference is included;
the location map table comprises at least one of information indicating a type of application data of the transport packet, information indicating a version of a location map table, information indicating a number of sub-data channels for real-time media data from among data channels, information indicating locations of the sub-data channels for the real-time media data, information indicating a number of sub-data channels for Internet Protocol (IP) data, information indicating locations of the sub-data channels for IP data, information indicating a number of sub-data channels for object data, and information indicating locations of the sub-data channels for object data;
the linkage information table comprises at least one of information indicating a number of services that can be provided through a current transport channel, information indicating a version of the linkage information table, and information indicating at least one service, wherein the information indicating at least one service comprises at least one of information indicating the identifications (IDs) of the services through the current transport channel and information indicating at least one component of each of the services, wherein the information indicating at least one component comprises at least one of information indicating whether a next pointer exists and information indicating an index number of the location map table.

16. The apparatus of claim 12, wherein:
the service configuration information generation unit generates service configuration information that comprises information about the turbo channel and information about the frame group;
the information about the turbo channel comprises at least one of information indicating a version of the turbo channel information, information indicating a total number of turbo services, information indicating an identification (ID) of a current turbo service, information indicating a start location of a turbo stream, information indicating an index of a turbo channel length, information indicating a coding rate of the turbo channel, information indicating a number of a start frame of the current turbo service, and information indicating a number of frames required to get the current turbo service;
the service information channel is located in a transport channel located at a predetermined location on the transport stream from among the at least one transport channels on the transport stream, and the turbo channel is located in a transport channel other than the service information channel; and the frame group information comprises at least one of information indicating a number of a current frame in a current frame group and information indicating a total number of frames included in the current frame group, and when the service configuration information is changed, the service configuration information is updated and a version number of the service configuration information is changed.

17. A method of receiving mobile broadcasting services, the method comprising:
determining a predetermined transport channel by using service configuration information extracted from a service information channel;
extracting at least one transport packet from the determined transport channel;
extracting information about structures of the at least one transport packet from the at least one transport packet;
generating at least one encapsulation packet including the at least one transport packet by using the information about the structures of the at least one transport packet; and
generating application data including the encapsulation packets by using information about the encapsulation packets which is extracted from the encapsulation packets,
wherein the transport channel is a data area at a predetermined location within a transport frame,
wherein the information about the structures of the at least one of transport packet comprises at least one of basic configuration information, a location map table, and a linkage information table, and
wherein the service configuration information comprises at least one of information about a turbo channel, and information about a frame group.

18. The method of claim 17, wherein the transport channel is a data area at a predetermined location on a transport stream included in a received frame.

19. The method of claim 17, wherein:
the determining the transport channel comprises extracting information about the turbo channel from the service configuration information;
the information about the turbo channel comprises at least one of information indicating a version of the turbo channel information, information indicating a total number of turbo services, information indicating an identification (ID) of a current turbo service, information indicating a start location of a turbo stream, information indicating an index of a turbo channel length, information indicating a coding rate of the turbo channel, information indicating a number of a start frame of the current turbo service, and information indicating a number of frames required to get the current turbo service; and
the service information channel is located in a transport channel located at a predetermined location on the transport stream among at least one transport channels on the transport stream, and the turbo channel is located in a transport channel other than the service information channel.

20. The method of claim 17, wherein:
the determining the transport channel comprises extracting information about the frame group from the service configuration information, wherein the frame group information comprises at least one of information indicating a number of a current frame in a current frame group and information indicating a total number of frames included in the current frame group; and if the service configuration information is changed, the service configuration information is updated and a version number of the service configuration information is changed.

21. The method of claim 17, wherein:
in the generating the encapsulation packets, the information about the at least one transport packet comprises the basic configuration information about the transport packets; and
the basic configuration information comprises at least one of information indicating whether decoder configuration information is included, information indicating whether a location map table is included, information indicating whether a linkage information table is included, and information indicating whether a program clock reference (PCR) is included.

22. The method of claim 17, wherein:
in the generating the encapsulation packets, the information about the transport packets comprises the location map table; and
the location map table comprises at least one of information indicating a type of application data of the transport packet, information indicating a version of a location map table, information indicating a number of sub-data channels for real-time media data from among data channels, information indicating locations of the sub-data channels for the real-time media data, information indicating a number of sub-data channels for IP data, information indicating locations of the sub-data channels for IP data, information indicating a number of sub-data channels for object data, and information indicating locations of the sub-data channels for object data.

23. The method of claim 17, wherein:
in the generating the encapsulation packets, the information about the transport packets comprises the linkage information table;
the linkage information table comprises at least one of information indicating a number of services that can be provided through a current transport channel, information indicating a version of the linkage information table, and information indicating at least one service;
the information indicating at least one service comprises at least one of information indicating the identifications (IDs) of the services through the current transport channel and information indicating at least one component of each of the services; and
the information indicating at least one component comprises at least one of information indicating whether a next pointer exists and information indicating an index number of a location map table.

24. The method of claim 17, wherein:
in the generating the application data, if the application data is real-time media data, information about the encapsulation packet comprises decoder configuration information; and
the decoder configuration information comprises at least one of a content type, a decoding buffer length, a length of decoder specification information, and the decoder specification information.

25. The method of claim 17, wherein in the generating the application data, if the application data is signaling media data, information about the encapsulation packet comprises at least one of information indicating whether data included in a payload area of the encapsulation packet is compressed, information indicating a type of data in the payload area, sequence number information, information indicating a version of the signaling encapsulation packet, and information indicating a total number of bytes of the payload area.

26. The method of claim 17, wherein:
in the generating the application data, if the application data is Internet Protocol (IP) media data and the encapsulation packet is a first packet, information about the encapsulation packet comprises at least one of information indicating whether additional data is included, information indicating a type of IP data of a payload area of the encapsulation packet, information specifying reserved bits, and information indicating the number of bytes of the encapsulation packet; and
if the application data is IP media data and the encapsulation packet is not the first packet, the information about the encapsulation packet comprises at least one of information indicating reserved bits, information specifying a sequence number, and information indicating a number of bytes of the encapsulation packet.

27. The method of claim 17, wherein:
in the generating the application data, if the application data is object media data and the encapsulation packet is a first packet, information about the encapsulation packet comprises at least one of information specifying reserved bits, information indicating an identification number of object data of a payload area of the encapsulation packet, information indicating a type of object data, and information indicating a number of bytes of the encapsulation packet; and
if the application data is object media data and the encapsulation packet is not the first packet, the information about the encapsulation packet comprises at least one of information specifying reserved bits, information indicating a sequence number, and information indicating the number of bytes of the encapsulation packet.

28. An apparatus for receiving mobile broadcasting services, the apparatus comprising:
a transport channel determination unit which determines a predetermined transport channel by using service configuration information extracted from a service information channel;
a transport packet extraction unit which extracts at least one transport packet from the determined transport channel;
a transport packet information extraction unit which extracts information about structures of the at least one transport packet from the at least one transport packet;
an encapsulation packet generation unit which generates at least one encapsulation packet comprising the at least one transport packet by using the information about the structures of the at least one transport packet; and
an application data generation unit which generates application data comprising the encapsulation packets by using information about the at least one encapsulation packet which is extracted from the encapsulation packets,
wherein the transport channel is a data area at a predetermined location within a transport frame,
wherein the information about the structures of the at least one of transport packet comprises at least one of basic configuration information, a location map table, and a linkage information table, and
wherein the service configuration information comprises at least one of information about a turbo channel, and information about a frame group.

29. The apparatus of claim 28, wherein the transport channel is a data area at a predetermined location on a transport stream included in a received frame.

30. The apparatus of claim 28, wherein:

the transport channel determination unit extracts at least one of information about the turbo channel and information about the frame group from the service configuration information;

the information about the turbo channel comprises at least one of information indicating a version of the turbo channel information, information indicating a total number of turbo services, information indicating an identification (ID) of a current turbo service, information indicating a start location of a turbo stream, information indicating an index of a turbo channel length, information indicating a coding rate of the turbo channel, information indicating a number of a start frame of the current turbo service, and information indicating a number of frames required to get the current turbo service;

the service information channel is located in a transport channel located at a predetermined location on the transport stream among the at least one transport channel on the transport stream, and the turbo channel is located in a transport channel other than the service information channel;

the frame group information comprises at least one of information indicating a number of a current frame in a current frame group and information indicating a total number of frames included in the current frame group; and if the service configuration information is changed, the service configuration information is updated and a version number of the service configuration information is changed.

31. The apparatus of claim 28, wherein:

in the encapsulation packet generation unit, the information about the at least one transport packet comprises at least one of the basic configuration information about the transport packets, the location map table, the linkage information table, and a program clock reference (PCR);

the basic configuration information comprises at least one of information indicating whether decoder configuration information is included, information indicating whether a location map table is included, information indicating whether a linkage information table is included, and information indicating whether a program clock reference is included;

the location map table comprises at least one of information indicating a type of application data of the transport packet, information indicating a version of a location map table, information indicating a number of sub-data channels for real-time media data from among data channels, information indicating locations of the sub-data channels for the real-time media data, information indicating a number of sub-data channels for Internet Protocol (IP) data, information indicating locations of the sub-data channels for IP data, information indicating a number of sub-data channels for object data, and information indicating locations of the sub-data channels for object data;

the linkage information table comprises at least one of information indicating a number of services that can be provided through a current transport channel, information indicating a version of the linkage information table, and information indicating at least one service;

the information indicating at least one service comprises at least one of information indicating the identifications (IDs) of the services through the current transport channel and information indicating at least one component of each of the services; and the information indicating at least one component comprises at least one of information indicating whether a next pointer exists and information indicating an index number of the location map table.

32. The apparatus of claim 28, wherein:

in the application data generated by the application data generation unit, if the application data is real-time media data, the information about the encapsulation packet comprises decoder configuration information, wherein the decoder configuration information comprises at least one of a content type, a decoding buffer length, a length of decoder specification information, and the decoder specification information;

in the application data generated by the application data generation unit, if the application data is signaling media data, the information about the encapsulation packet comprises at least one of information indicating whether data included in a payload area of the encapsulation packet is compressed, information indicating a type of data in the payload area, sequence number information, information indicating a version of the signaling encapsulation packet, and information indicating a total number of bytes of the payload area;

in the application data generated by the application data generation unit, if the application data is Internet Protocol (IP) media data and the encapsulation packet is the first packet, the information about the encapsulation packet comprises at least one of information indicating whether additional data is included, information indicating the type of IP data of a payload area of the encapsulation packet, information specifying reserved bits, and information indicating the number of bytes of the encapsulation packet;

in the application data generated by the application data generation unit, if the application data is IP media data and the encapsulation packet is not the first packet, the information about the encapsulation packet comprises at least one of information specifying reserved bits, information specifying a sequence number, and information indicating the number of bytes of the encapsulation packet;

in the application data generated by the application data generation unit, if the application data is object media data and the encapsulation packet is the first packet, the information about the encapsulation packet comprises at least one of information specifying reserved bits, information indicating an identification number of object data in the payload area of the encapsulation packet, information indicating the type of the object data, and information indicating the number of bytes of the encapsulation packet; and in the application data generated by the application data generation unit, if the application data is object media data and the encapsulation packet is not the first packet, the information about the encapsulation packet comprises at least one of information specifying reserved bits, information indicating a sequence number, and information indicating the number of bytes of the encapsulation packet.

33. A non-transitory computer-readable recording medium having embodied thereon a computer program for performing a method of transporting mobile broadcasting services, the method comprising:

generating an encapsulation packet comprising configuration information corresponding to a type of application data to be transported and the application data;

generating transport packets comprising data of predetermined-sized parts into which the encapsulation packet is divided, wherein the transport packets further comprise information about structures of the transport packets; and generating service configuration information including information set about channels including the transport packets, and transmitting the service configuration information in a service information channel at a predetermined location from at least one transport channel on a transport stream, wherein the transport channel is a data area at a predetermined location within a transport frame, wherein the information about the structures of the transport packets comprises at least one of basic configuration information, a location map table, and a linkage information table, and wherein the service configuration information comprises at least one of information about a turbo channel, and information about a frame group.

34. A non-transitory computer-readable recording medium having embodied thereon a computer program for performing a method of receiving mobile broadcasting services, the method comprising:

determining a predetermined transport channel by using service configuration information extracted from a service information channel;

extracting at least one transport packet from the determined transport channel;

extracting information about structures of the at least one transport packet from the at least one transport packet;

generating at least one encapsulation packet comprising the at least one transport packet by using the information about the structures of the at least one transport packet; and generating application data comprising the encapsulation packets by using information about the encapsulation packets which is extracted from the encapsulation packets, wherein the transport channel is a data area at a predetermined location within a transport frame, wherein the information about the structures of the at least one of transport packet comprises at least one of basic configuration information, a location map table, and a linkage information table, and wherein the service configuration information comprises at least one of information about a turbo channel, and information about a frame group.

* * * * *